US010549538B2

(12) United States Patent
Xing et al.

(10) Patent No.: US 10,549,538 B2
(45) Date of Patent: *Feb. 4, 2020

(54) METHOD AND DEVICE FOR FILTERING THE RECYCLED ATMOSPHERE OF A PRINT HEAD

(71) Applicant: Dover Europe Sàrl, Vernier (CH)

(72) Inventors: Jean Xing, Bourg les Valence (FR); Adrien Marion, Lyons (FR); Francis Pourtier, Charmes sur Rhone (FR)

(73) Assignee: DOVER EUROPE SÀRL, Vernier (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,229

(22) Filed: Aug. 1, 2018

(65) Prior Publication Data

US 2018/0339518 A1    Nov. 29, 2018

Related U.S. Application Data

(63) Continuation of application No. 15/678,400, filed on Aug. 16, 2017, now Pat. No. 10,179,456.

(30) Foreign Application Priority Data

Aug. 16, 2016 (FR) ..................................... 16 57774

(51) Int. Cl.
*B41J 2/175* (2006.01)
*B41J 2/17* (2006.01)
(Continued)

(52) U.S. Cl.
CPC .......... *B41J 2/1714* (2013.01); *B01D 5/0036* (2013.01); *B01D 5/0072* (2013.01);
(Continued)

(58) Field of Classification Search
CPC ... B41J 2/02; B41J 2/145; B41J 2/1714; B41J 2/175; B41J 2/17563; B41J 2/185;
(Continued)

(56) References Cited

U.S. PATENT DOCUMENTS 4,929,963 A    5/1990 Balazar
5,273,572 A    12/1993 Baker et al.
(Continued)

FOREIGN PATENT DOCUMENTS

EP    0 768 106 A1    4/1997
EP    0 816 097 A2    1/1998
(Continued)

OTHER PUBLICATIONS

Search Report issued in French Patent Application No. 1657774 dated Apr. 13, 2017.
(Continued)

*Primary Examiner* — Anh T Vo
(74) *Attorney, Agent, or Firm* — Pearne & Gordon LLP

(57) ABSTRACT

A device for recovery of an atmosphere containing solvent vapours from at least one ink recovery reservoir of a print machine comprising: n (n≥1) filter(s) arranged downstream from the at least one ink recovery reservoir, each filter: comprising an inlet face, an outlet face and a filter body between these two faces, and each of the filter being upstream from a condenser or other solvent extraction structure, an atmosphere output from the at least one ink recovery reservoir passing through a separator and through the inlet face, and then through the filter body and through the outlet face before being sent to the solvent extraction structure, the device further comprising at least one second reservoir to recover liquid from the separator.

23 Claims, 14 Drawing Sheets

(51) Int. Cl.
*B41J 2/02* (2006.01)
*B41J 2/145* (2006.01)
*B41J 2/185* (2006.01)
*B01D 5/00* (2006.01)

(52) U.S. Cl.
CPC .............. *B01D 5/0081* (2013.01); *B41J 2/02* (2013.01); *B41J 2/145* (2013.01); *B41J 2/175* (2013.01); *B41J 2/17563* (2013.01); *B41J 2/185* (2013.01); *B41J 2002/1853* (2013.01)

(58) Field of Classification Search
CPC ........... B41J 2002/1853; B01D 5/0036; B01D 5/0072; B01D 5/0081
See application file for complete search history.

(56) References Cited

U.S. PATENT DOCUMENTS

| | | | |
|---|---|---|---|
| 5,367,882 | A | 11/1994 | Lievens et al. |
| 5,730,002 | A | 3/1998 | Collin |
| 5,772,734 | A | 6/1998 | Baker et al. |
| 7,192,121 | B2 | 3/2007 | Barbet |
| 8,540,350 | B2 | 9/2013 | Barbet |
| 10,179,456 | B2 * | 1/2019 | Xing .................... B01D 5/0036 |
| 2007/0229611 | A1 | 10/2007 | Nagashima |
| 2011/0141207 | A1 * | 6/2011 | Fost ......................... B41J 2/18 347/84 |
| 2012/0299989 | A1 | 11/2012 | Prothon |
| 2012/0327145 | A1 | 12/2012 | Pouzet |
| 2015/0258805 | A1 | 9/2015 | Stamp |
| 2016/0052291 | A1 | 2/2016 | Pourtier |
| 2016/0332449 | A1 * | 11/2016 | Pourtier ............... B41J 2/16552 |
| 2016/0347074 | A1 | 12/2016 | Ribeiro |
| 2017/0028736 | A1 | 2/2017 | Pourtier |
| 2017/0173961 | A1 | 6/2017 | De Saint Romain |
| 2017/0217200 | A1 | 8/2017 | Ribiero |
| 2017/0334737 | A1 | 11/2017 | Govindan |

FOREIGN PATENT DOCUMENTS

| | | |
|---|---|---|
| EP | 2 516 167 | 10/2012 |
| FR | 2 851 495 A1 | 8/2004 |
| FR | 2 952 851 | 5/2011 |
| WO | 2011/076810 A1 | 6/2011 |
| WO | 2011/092321 A1 | 8/2011 |
| WO | 2012/038520 A1 | 3/2012 |
| WO | 2013/173200 A1 | 11/2013 |
| WO | 2014/164932 A2 | 10/2014 |

OTHER PUBLICATIONS www.boutique.afnor.org/norme/nf-en-1822-5/filtres-a-air-a-haute-efficacite-epa-hepa-et-ulpa-partie-5-mesure-de-l-efficacite-de-l-element-filtrant/article/619183/fa157748.
cerig.pagora.grenoble-inp.fr/tutoriel/non-tisse/page01.htm.
P. C. Raynor and D. Leith, in "The influence of accumulated liquid on fibrous filter performance", Journal of Aerosol Science, vol. 31, No. 11, pp. 19-34, 2000.
European Search Report and search opinion dated Jan. 3, 2018 for EP 17186002.

* cited by examiner

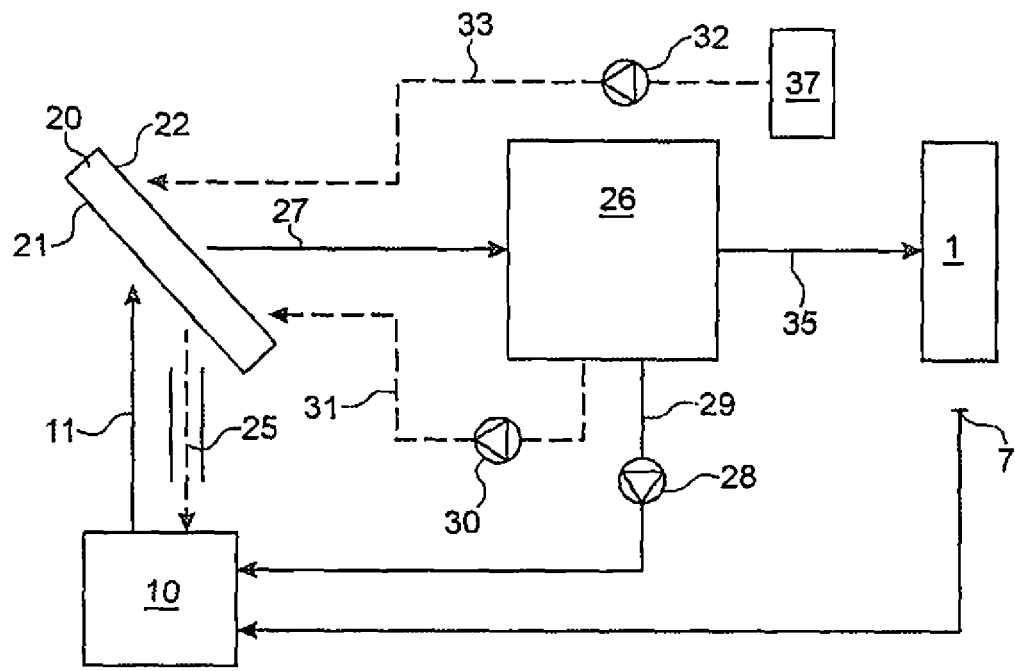
FIG.5A
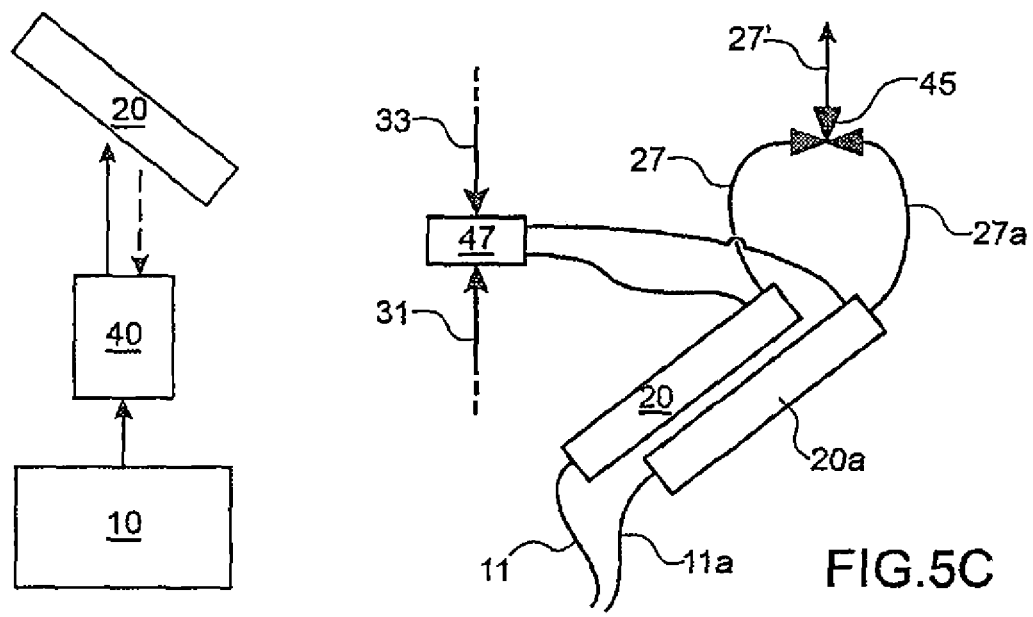
FIG.5B
FIG.5C

METHOD AND DEVICE FOR FILTERING THE RECYCLED ATMOSPHERE OF A PRINT HEAD

CROSS-REFERENCE TO RELATED APPLICATIONS

This is a continuation of prior U.S. application Ser. No. 15/678,400 filed Aug. 16, 2107, which claims priority of French Application No. 16 57774 filed Aug. 16, 2016. The content of each these applications is incorporated by reference herein in its entirety.

TECHNICAL DOMAIN AND PRIOR ART

The invention relates to print machines, for example continuous inkjet printers, and particularly but not exclusively to binary continuous jet printers provided with a multi-nozzle drop generator. It is aimed particularly at improving an ink and solvent recovery circuit for these printers.

Continuous jet printers comprise:
an ink drop generator,
means of separating trajectories of drops generated by the generator and directing them towards a printing support or to a catcher.

FIG. 1 show the main modules in an inkjet printer. In a known manner, the printer comprises a console 300, a compartment 400 containing in particular ink and solvent conditioning circuits, and reservoirs for the ink and solvents. In general, the compartment 400 is in the lower part of the console. The top part of the console comprises the control and instrumentation electronics and display means. The console is hydraulically and electrically connected to a print head 1 through an umbilical 200. A portal frame not shown is used to install the print head facing a print support 800. The print support 800 moves along a direction represented by an arrow. This direction is perpendicular to an alignment axis of the nozzles.

The drop generator comprises nozzles aligned on a nozzle plate along a nozzle alignment axis X. During printing, these nozzles eject inkjets continuously in a direction Z perpendicular to the nozzle plate. Continuous jet printers include deviated jet printers and binary continuous jet printers. Drops formed in deviated continuous jet printers from a nozzle during the time taken to print a position on a print support may or may not be deviated. For each print position and for each nozzle, a segment perpendicular to the movement direction of the print support is printed. Deviated drops are deviated such that they will strike the print support on the required part of the printed segment, considering the motif to be printed. Undeviated drops are recovered in a catcher. Deviated continuous jet printers usually comprise few ejection nozzles, but each nozzle can print several pixels distributed on the print segment for each print position on the support, depending on the motif to be printed.

In binary continuous jet printers, ink from a nozzle only prints one pixel for each print position. The pixel considered does not receive any drops or receives one or several drops as a function of the motif to be printed. Consequently, for a high printing speed, the nozzle plate comprises a large number of nozzles, for example 64, to enable simultaneous printing of one pixel for each nozzle. Drops that are not required for printing are recovered in a gutter or catcher. Such printers and continuous jet print heads have been extensively described.

A general structure of a print head for a binary continuous jet printer is described below with reference to FIG. 2.

The head shown includes a drop generator 11. An integer number n of nozzles 4 are aligned on a nozzle plate 2 along an X axis, between a first nozzle $4_1$ and a last nozzle $4_n$.

The first and the last nozzles ($4_1$, $4n$) are the nozzles with the greatest distance between them.

Each nozzle has a jet emission axis parallel to a Z direction or axis (located in the plane of FIG. 2), perpendicular to the nozzle plate and to the X axis mentioned above. A third axis, Y, is perpendicular to each of the X and Z axes, the two X and Z axes extending in the plane of FIG. 2.

Each nozzle is in hydraulic communication with a pressurised stimulation chamber. The drop generator comprises one stimulation chamber for each nozzle. Each chamber is provided with an actuator, for example a piezo-electric crystal. An example design of a stimulation chamber is described in document U.S. Pat. No. 7,192,121.

There are sort means or a sort module 6 downstream from the nozzle plate, that will be used to separate drops used for printing from drops or jet segments not used for printing. FIG. 4 shows a trajectory a of ink drops passing through a slit 17, and a trajectory b of ink drops directed towards a gutter 7.

More precisely, drops or jet segments emitted by a nozzle and that will be used for printing follow a trajectory a along the Z axis of the nozzle, and then strike a print support 8, after having passed through the outlet slit 17 (shown in dashed lines in FIG. 2). The slit is open to the outside of the cavity and ink drops to be printed exit through it; it is parallel to the X direction of nozzle alignment, the Z direction axes of the nozzles passing through this slit, that is on the face opposite the nozzle plate 2. Its length is equal to at least the distance between the first and the last nozzle.

Drops or jet segments emitted by a nozzle and not intended for printing, are deviated by means 6 (they follow a trajectory such as trajectory b) and are recovered in a catcher 7 and then recycled. The length of the catcher along the X direction is equal to at least the distance between the first and the last nozzle.

For example, document U.S. Pat. No. 8,540,350 (FR 2 952 851) that describes a method of avoiding crosstalk between jets from nozzles adjacent to each other, could be referred to particularly for information about the formation of jets and breaking the jets to form drops, and about the deviation of drops. Reference could also be made to prior art described in patent U.S. Pat. No. 7,192,121 (FR 2 851 495) describing jet breaking positions depending on whether a drop formed by breaking the jet will or will not strike the print support.

Liquid inks are used in continuous jet printers. These inks contain a solvent in which ink components are dissolved. It is desirable that ink should dry quickly once it has been deposited on the print support. This is why the solvents used are volatile. The most frequently used solvents are methyl ethyl ketone known as "mek", acetone or alcohols for example such as ethanol. However, there are disadvantages related to the use of a volatile solvent. Since it is volatile, the solvent escapes from the ink in the form of vapours.

Application WO 2012/038520 includes means of overcoming the disadvantage resulting from the presence of solvent vapour around the jets. Apart from a first portion of vapour that can condense on the walls of the cavity in which the jets circulate, a second portion exits outside this cavity through a slit in the cavity through which drops necessary for printing will pass. This second part is mixed with ambient air that is thus contaminated. This contamination can lead to the refusal of an environmental quality label. When the solvent concentration exceeds a given threshold, air becomes unsuitable for breathing. Finally, if the concentration rises, the air-solvent mix can be potentially explosive.

Like this invention, the solution disclosed in application WO 2012/038520 concerns binary continuous jet printers. A small portion of ink in these printers, of the order of 10%, is directed towards the print support. This means that a preponderant part of ink emitted by the nozzles is directed towards a gutter. The different jets together form a liquid curtain that is directed towards the gutter. Only a small proportion of the ink ejected by the nozzles leaves this curtain in the form of drops directed towards the print support. These drops exit from the cavity through a slit parallel to the nozzle alignment direction. The length of this slit is slightly greater than the distance separating the nozzles with the greatest distance between each other on the nozzle plate. The liquid curtain moves towards the catcher at a velocity $V_j$. As a result of viscosity, air around this curtain is entrained in the same direction as the jets.

Air immediately in contact with the liquid is entrained at a velocity equal to approximately $V_j$. As the radial distance from the jet increases, the air velocity reduces until a limit is reached at which its velocity is low in comparison with the velocity $V_j$. The thickness of a so-called "boundary layer" is thus the distance between the liquid air boundary and the limit at which air is no longer entrained by the liquid.

But this solution disclosed in application WO 2012/038520 is not satisfactory and cannot recover a maximum quantity of solvent vapours present in the cavity of the print head in which the jets circulate. It also limits the Schmidt coefficient of the ink used.

It is also unsuitable for high flows, for example of the order of several tens or several hundred litres per hour.

However, high flows lead to higher risks of condensation in the conduits and in the print head.

Application WO 2013/173200 describes an example of an ink and solvent recovery circuit in which the ink and gases drawn in through a catcher are directed into a pressurised ink reservoir in which ink is deposited by gravity.

Once again, this solution is not satisfactory and cannot recover a maximum amount of solvent vapours present in the cavity of the print head inside which the jets circulate and is also unsuitable for high flows, for example of the order of several tens or several hundreds of litres per hour.

PRESENTATION OF THE INVENTION

Therefore ink flows involved in the case of a multi-jet print head are very high, and the inventors estimate that 70% of losses in vapour form originate from the head and 30% from the umbilical/ink circuit pair. If the source of losses in the head is stopped due to any mechanism whatsoever, we cannot conclude that the evaporation will be reduced by 70% because the equilibrium will be modified and losses in the ink circuit will be increased.

One solution would consist of:
completely purifying the flow by extracting solvent vapours and particles before release into the environment,
and supplying air drawn in from outside the head to the jet curtain.
But purification would be very energy consuming, particularly under extreme environment conditions (ambient temperature up to 45° C.). Moreover, the fresh air supply would be conducive to evaporation and would lead to accumulative condensates of water vapour originating from air surrounding the head, inside the system (particularly for a relative humidity of 90% coupled with an ambient temperature of 45° C.).

Therefore one problem that arises is to treat and recycle the flow in the recovery line. This could minimise the amount of the treatment. Indeed:
the desaturation level can then be limited so that no condensation is created in the return line to the head;
the need to draw in outside air is reduced, since most of the air flow entrained by the jets is derived from recycling; air renewal is thus reduced and consequently the increase of the water content in the system will take place more slowly.

Therefore an attempt is made to create a (quasi-)closed loop by drawing in the entire air flow entrained by the jet curtain and returning it to the print head.

Nevertheless, the volume in the print head communicates with the exterior through the print slit. Considering the fast dynamics imposed by the jet curtain, it seems to be too demanding, for the physical parameters, to guarantee that there will be zero exchange between the print head and the external environment. This exchange will directly control the potential to reduce solvent consumption and the increased concentration of water in the ink; exchange of air with the exterior through the jet outlet orifice means that gas containing solvent vapour escapes; external gas is drawn into the system to compensate for the lost flow, and this intake will introduce humidity.

However, if well chosen physico-hydraulic parameters would enable such a self-circulation situation in this space, pollution would accumulate due to the diffusion of ink particles through the liquid/gas interface. Moreover, the ink circuit is also a source of generation of liquid and solid aerosols due to circulation in a closed space with air in contact with the ink, at a velocity of a few m/s.

The mechanism for generation of aerosols (firstly ink particles (colorant coated with resin, all in a solvent), and secondly solvent drops without dry extract) can be mechanical and thermodynamic, and there can be various sources:
the formation of jets in which the projection of an ink jet through the nozzle induces strong acceleration (by the relaxation effect) at its interface and generates particles;
splashes due to impact of the jet or drops either with a solid body or in a two-phase flow;
tearing off by a gas flow that shears a liquid surface that contains solid elements;
evaporation, during which diffusion of liquid molecules to the gas environment entrains particles (dry extracts) to the gas environment, as long as the partial pressure has not reached its saturation level.

Therefore the operating conditions of a CIJ printer, particularly of the multi-jet type, impose severe constraints on management of solvent consumption related to fast evaporation resulting from the jet curtain.

It can be considered that the saturation level is reached in several phases: firstly, splashing at the interface (gas/liquid/solid substance) generates droplets (of inks) that then evaporate tending to fill in the partial pressure. This process can generate a very wide range of diameters of more or less wet particles. The next step is very small diameter particle coalescence processes (due to Brownian movements); these processes associated with the condensation by nucleation mechanism make very small particles disappear; sedimentation is associated with evaporation (see Table 1) to make large particles disappear. In particular, this table shows that the settling speed depends on the square of the particle diameter.

TABLE 1

| d (µm) | v (m/s) |
|---|---|
| 0.1 | 8.80E−07 |
| 0.5 | 1.00E−05 |
| 1 | 3.50E−05 |
| 5 | 7.80E−04 |
| 10 | 3.10E−03 |

(source R C Flagan: Fundamentals of air pollution engineering, page 300)

Consequently, the diameter of particles to be treated varies between 10 nm or a few tens of nm and a few hundred nm (or 1 µm), that are not visible to the naked eye. The distribution of particle sizes was confirmed by tests, and is typically centred on 400 nm.

P. C. Reynor and D. Leith, in "The influence of accumulated liquid on fibrous filter performance", Journal of Aerosol Science, vol. 31, No. 11, pp. 19-34, 2000, modelled the wet aerosols filtration process in a filter as illustrated in FIG. 3.

This diagram represents the filtration process in general, unrelated to any application to CIJ printers. In FIG. 3, the filter inlet flow contains air, solvent vapour, aerosols (wet particles and droplets, with or without dry extracts).

In this scheme, large droplets (or aerosols), are intercepted and the dry part contributes to the formation of the "cake", locally or on a large area of the filter. The consequence of such saturation is a reduction in the number and/or diameter of pores that enable passage of the flow and therefore a reduction in the effective surface area of the filter, which increases the flow rate, increases the head loss and accentuates entrainment of particles to the downstream side of the filter; thus the required filtration function stops working.

At the filter outlet, the medium is composed of vapour and drops, some of which are not collected, while others will make up the flow of drained liquid. And there is a risk of introducing particles in the vapours that originate from drops forming the drained liquid.

There is also a practical problem in evacuating drained liquid to the ink reservoir because the reservoir is at higher pressure than the filter outlet zone.

Secondary aerosols can be created by evaporation of the condensate contained in the membrane. This forms the mechanism for transfer of aerosols to the downstream side. Consequently, the migrated drops will release charged particles by an evaporation effect and/or the filter medium will be saturated with humidity and trapped particles, making the head loss unacceptable for the application.

Pure gas and dry steam can pass through the membrane, without introducing any pollution downstream from the filter (see the arrow at the top of FIG. 3).

The particles and/or aerosols that will be deposited on the fibres of the filter membrane (by the interception mechanism) can be dissolved by the solvent originating from condensation, and can be entrained by this solvent that migrates to the outlet under the effect of pressure. Evaporation of the pure solvent part only generates pure vapour. On the other hand, the condensate containing particles evaporates once it is located at the filter outlet, so that particles can be released and thus part of the filtration function is lost (in FIG. 3, an intermediate "Evaporation" part joins the vapour part indicated by the top arrow, while another intermediate part ("Uncollected drops, Re-entrainment") joins the aerosols and drops release arrow)

Condensed liquid that has not evaporated, is symbolised by the bottom arrow in FIG. 3: "Drained liquid".

One solution consists of varying the flow configuration by increasing the filter surface area with a folded structure (the filter then forms an accordion that increases the surface area of the membrane without correspondingly increasing the size), that reduces the flow velocity. This firstly increases the capacity to contain filtered particles, and secondly slows the increase in the head loss so as to increase the life of the component to an acceptable level.

However, the inventors have observed that drainage to the downstream direction (as is FIG. 3) is not compatible with the anti-pollution function. As explained above, it is possible that particles are released in the gas flow; furthermore, the pressure on the downstream side is higher than the pressure on the upstream side, therefore it is difficult to pump on the downstream side. It can also be noted that the operating configuration in a CIJ printer is not operation in a dry state for which the filter material supplier can guarantee a high efficiency of more than 99.97%; and this efficiency is accentuated as a cake of filtered particles is formed progressively.

Furthermore, observations made could not justify a compromise between the dimensions of the filter system and its life (decided upon based on the head loss and/or the time before occurrence of pollution released to the downstream side).

The invention discloses a device for recovery of the atmosphere containing solvent vapours from a printer or at least one print head of a printer or at least one ink recovery reservoir from at least one print head of a printer, comprising:

n (n≥1) filter(s), that will be arranged at the outlet from at least one ink reservoir, each filter comprising an inlet face, an outlet face and a filter body between these two faces, the atmosphere to be filtered passing through the inlet face, and then the filter body and the outlet face.

The invention applies, here and in the remainder of this application to a print machine, in particular to ink jet printers, one example being a CIJ printer.

For example: n=2.

Each filter, or the device for recovery, may comprise means of recovering at least part of the liquid condensed on its inlet face, and/or to eliminate at least some of this liquid, before it passed through the filter.

A filter in a device according to an aspect of the invention is mainly for separating solid particles from gas.

A wet flow in the filter, by direct interception or by condensation, would entrain particles in the depth of the filter, and one aspect of the invention assures that intercepted particles do not pass through the filter material and exit from the downstream side (or on the side of the inlet face). In other words, a means is provide to eliminate not only the condensed humidity through the inlet face, but also the particles contained in it.

Therefore the invention can be used to make a closed loop so as to recycle air drawn in through the gutter of a printer, for example a CIJ type printer, particularly a multi-jet printer, this recycling cleaning air that is sent (back) to the print head(s).

The filter, or each of said filters, can be placed on the upstream or downstream side (considering the direction of circulation of the atmosphere or air in the recovery circuit) of solvent extraction means. These means can extract solvent from an inlet gas flow and produce firstly liquid solvent and secondly a gas flow in which the content of solvent vapour is lower than that in the inlet flow. These means are for example condensation means or adsorption means or membrane separation means.

In the first case (filter located upstream from the solvent extraction means), the atmosphere to be filtered exits from the reservoir and the filtered gas is sent to the solvent extraction means.

In the $2^{nd}$ case (filter located downstream from the solvent extraction means), the atmosphere to be filtered exits from the solvent extraction means and the filtered gas is sent to at least one print head.

Such a device in which n>1, may also comprise means of selecting a single filter to treat the atmosphere or gas to be filtered, that can for example exit from the reservoir or one of a number of reservoirs or from the solvent extraction means (according to one of the 2 cases envisaged above).

According to one embodiment, said recovery means may bring at least part of the liquid condensed on the inlet face of each of the n filter(s) to a reservoir.

Means can also be provided to direct the liquid that flows by gravity from the filter inlet face, to this reservoir.

This recovery reservoir can be the reservoir from which the atmosphere or gas to be treated originates; it is preferably a $2^{nd}$ reservoir different from the $1^{st}$ reservoir (from which the atmosphere or gas to be treated originates), to better manage viscosity (otherwise, solvent is added into the $1^{st}$ reservoir without any control over what is added). Thus, means can be provided, for example one or more conduits called separation conduits, to send a vapour or gas to be treated to the filter(s), while a liquid, for example resulting from cleaning a filter, is sent to the $2^{nd}$ reservoir but not to the $1^{st}$ reservoir.

The filter is not saturated with particles initially, but during operation, humidity and particles captured by the filter reduce the filter passage area, increasing the flow velocity and tending to degrade the equilibrium created in the first place when the filter was in the new (or fresh) condition. Consequently, means may be provided for on line cleaning of the filter(s).

A device according to the one particular embodiment of the invention can also comprise the following, for the above purpose:
  means of bringing or introducing some of the liquid outlet from solvent extraction means or from a solvent reservoir, through the outlet face of at least one filter, or of each filter and then through said filter(s);
  and/or means of bringing or introducing some of the gas outlet from solvent extraction means or from a gas reservoir, or gas filtered by another filter, through the outlet face of at least one filter, or of each filter of a plurality of filters, and then through said filter(s).

Thus, products are used which originate from solvent extraction means, for example products that result from condensation in these solvent extraction means (for example in the case of filters located upstream from the solvent extraction means), or solvent from a solvent reservoir (for example in the case of filter(s) located downstream from the solvent extraction means), to clean one of the filters from its outlet face.

Drying is done using some of the gas outlet from the solvent extraction means (for example in the case of several filters upstream from the solvent extraction means), or from a gas reservoir (for example in the case of a single filter located upstream or downstream from the solvent extraction means), or that is sent to the print head after having been filtered by another filter (for example in the case of several filters located downstream from the solvent extraction means).

Regardless of the configuration, a reverse current of solvent can thus be introduced (in the direction opposite the normal direction of gas circulation in the filter when this gas is being filtered) to flush out particles trapped in the mass of the filter, towards its inlet face.

A reverse current of gas can also be introduced (also in the direction specified above) to dry the filter and thus restore it to a clean condition similar to its new condition.

This active maintenance action eliminates the portion of uncollected or re-entrained droplets. Otherwise, particles will be brought to the outlet face of the filter.

For the case in which n>1, a device according to the invention may comprise means of selecting a channel in which:
  some of the liquid output from the solvent extraction means or a solvent reservoir will be circulated to the output face of only one of the filters;
  and/or some of the gas output from the solvent extraction means or from a gas reservoir, or that is sent to the print head after having been filtered by another filter, will be circulated to the output face of only one of the filters.

Preferably, when n>1, the different filters communicate with the same atmosphere (through their input side).

Means can also be provided:
  for selecting a $1^{st}$ filter to treat an atmosphere to be filtered, for example output from the reservoir or from solvent extraction means,
  while the means of selecting a circulation channel to the outlet face of another of the filters, are used to select a circulation channel, towards the outlet face of another filter, different from the $1^{st}$ filter, of part of the liquid output from the solvent extraction means (for cleaning) or part of the gas (for rinsing).

For the case in which n>1, a device according to the invention may comprise means of selecting filtering of the atmosphere to be filtered by one $1^{st}$ filter, and means of simultaneously cleaning another filter, different from the $1^{st}$ filter.

In a device according to the invention, the means of recovering at least part of the liquid condensed on the inlet face of at least one, or of each, filter may comprise means of recovering a liquid flowing by gravity from the inlet face of the filter.

The invention also relates to a circuit to supply at least one print head (of a print machine, in particular an ink jet printer, for example a CIJ printer), comprising:
  at least one reservoir, to recover ink not used for printing and to supply at least one print head;
  a recovery device of the atmosphere originating from at least one reservoir, according to one of the embodiments presented in this application.

The invention also relates to a printer, in particular to an ink jet printers, for example of the CIJ type, comprising at least one print head, for example an ink-jet print head, in particular of a CIJ printer, and a circuit according to the invention, the head comprising means for forming k jets, where k≥1.

The invention also relates to a method for recovery of the atmosphere containing solvent vapours from a printer, or from at least one print head of a printer or from at least one ink recovery reservoir from at least one print head of a printer, comprising:
  filtration of an atmosphere output from at least one ink reservoir of the printer making use of at least one filter, this filter comprising in inlet face, an outlet face and a filter body between these two faces, the atmosphere to be filtered passing through the inlet face, and then the filter body and the outlet face.

The printer can be in particular an ink jet printer, one example being a CIJ printer.

Preferably, at least part of a liquid condensed on the surface of the inlet face of the filter is recovered, before this liquid has passed through it.

The flow velocity being inversely proportional to the area of the filter, the filter can be sized to be large enough to limit the velocity. The entrainment of the condensate into the depth of the filter is thus minimised: this entrainement makes particles migrate to the output side of the filter and is an unwanted phenomenon. Imposing a surface area of the filter above a specific value therefore helps to achieve the required equilibrium state. Indeed, one problem is the migration of particles from the input side to the output side of the filter, which is amplified by the gas flow velocity through the filter. For a given flow rate, a surface area is therefore preferably selected so as to have a low flow velocity, for example <0.1 m/s.

In a printing process according to the invention, printing with a printer is performed while a method according the invention is performed for recovering of the atmosphere containing solvent vapours from the printer. The filter(s), or each of said filters, can be placed on the upstream or downstream side (considering the direction of circulation of the atmosphere or air in the recovery circuit) of the solvent extraction means. As explained above with reference to the device, these means can extract solvent from an inlet gas flow and produce firstly solvent that can be liquid and secondly a gas flow in which the content of solvent vapour is lower than that in the inlet flow. These means are for example condensation means or adsorption means or membrane separation means.

In the first case (filter located upstream), the atmosphere to be filtered is output from the reservoir and the filtered gas is sent to the solvent extraction means.

In the $2^{nd}$ case (filter located downstream), the atmosphere to be filtered is output from the solvent extraction means and the filtered gas is sent to the print head.

The following can be introduced into the filter or into at least one of said filters through its outlet face:
part of the liquid that exits from the solvent extraction means, respectively from a solvent reservoir, to clean the filter;
and then possibly part of the gas that exits from the solvent extraction means or from a gas reservoir, respectively of gas filtered by another filter, to dry the filter.

Thus, the products (particularly the solvent) used are derived from solvent extraction means, for example by the condensation effect (for example in the case of filters located upstream from the solvent extraction means), or solvent from a solvent reservoir (for example in the case of filter(s) located downstream from the solvent extraction means), to clean one of the filters from its outlet face.

Rinsing can be done using part of the gas output from solvent extraction means (for example in the case of several filters upstream from the solvent extraction means), or from a gas reservoir (for example in the case of a single filter located upstream or downstream from the solvent extraction means), or that is sent to the print head after having been filtered by another filter (for example in the case of several filters located downstream from the solvent extraction means).

Therefore the filter can be regenerated by performing a maintenance operation, namely rinsing with solvent and drying.

When n>1, a channel for circulation of part of the cleaning liquid and/or part of the rinsing gas to only one of the filters can be selected.

For example, a $1^{st}$ filter is selected to treat the atmosphere originating from or output from the reservoir, and a channel is selected to circulate, to a $2^{nd}$ filter (different from the $1^{st}$ filter), part of the liquid output from solvent extraction means or from a solvent reservoir respectively, or part of the gas output from solvent extraction means or that is sent to the print head after having been filtered by the $1^{st}$ filter. When n>1, the atmosphere output from the reservoir can be filtered by a $1^{st}$ filter, and a $2^{nd}$ filter (different from the $1^{st}$ filter) can be cleaned at the same time.

Printing can therefore be performed while at least one of the filters is being cleaned, at least one other filter filtering the atmosphere output from the reservoir.

According to one particular embodiment, at least part of the liquid condensed on the inlet face of each filter flows by gravity from the inlet face of the filter and is possibly directed to the reservoir. This is advantageously achieved by inclining the filter such that its inlet face is facing the reservoir from which the air to be treated comes.

The liquid that flows by gravity from the inlet face of the filter to the reservoir can be recovered firstly by a liquid-gas separator placed between the filter and the reservoir.

The condensate created by the filter device (the membrane and the structure) can be the main contributor to drainage, thereby allowing evacuation of some of the trapped particles. The dynamic equilibrium is made as a function of the "chosen" side on which the drainage is evacuated, using the following elements:
the surface area of the filter imposes the initial flow velocity,
the inclined position of the filter reinforces the effect of gravity, forces moisture to be evacuated to the upstream side, and slows the migration of particles to the downstream side.

The solvent recovery reservoir from the inlet face of the filter(s) can be the reservoir from which the atmosphere or the gas to be treated originates; it is preferably a $2^{nd}$ reservoir, different from the $1^{st}$ reservoir (from which the atmosphere or gas to be treated originates), so as to not disturb the viscosity in this $1^{st}$ reservoir. Thus, a vapour or a gas to be treated by the filter(s) can be separated from a liquid (or solvent) resulting for example from cleaning a filter, to send this liquid to the $2^{nd}$ reservoir.

The embodiment in which a filter is positioned upstream of the solvent extraction means is advantageous; in particular, it enables the filter to be rinsed by solvent droplets originating from the gas flow. It means that the gas flow saturated with solvent (but without condensation before entering the filter module) can be treated, which will create humidity by natural condensation (in particular if the ink reservoir is the hottest point in this part of the circuit); this humidity is useful to create a liquid current on the inlet surface of the filter, continuously entraining surface particles to the drainage channel. On the other hand, more humidity would accentuate the phenomenon of closing pores in the filter, increasing the flow velocity, and would limit or destroy the natural drainage mechanism. In other words gas containing, or being loaded with, solvent condensation at the input side of the filer (which is at lower temperature than the ink reservoir) is favourable to entrain surface particles; but too much condensation would saturate the filter and close the pores of the filter.

In a printing process according to the invention, printing is stopped to clean the filter (if there is only one filter) and then printing is resumed after cleaning. If there are at least 2 filters, printing can be continued while at least one filters is being cleaned, at least one other filter filtering the atmosphere output from the reservoir or from the separator.

BRIEF DESCRIPTION OF THE DRAWINGS

Other advantages of the invention will become clear from the description of details of an example embodiment of the invention given below with reference to the appended drawings among which:

FIG. 5A represents the structure of a solvent recovery circuit according to the invention, with a filter placed on the upstream side of the solvent extraction means, FIG. 5B represents a variant of a structure of a solvent recovery circuit according to the invention, with a filter placed on the upstream side of the solvent extraction means, FIG. 5C represents a variant of a structure of a solvent recovery circuit according to the invention, with 2 filters placed on the upstream side of the solvent extraction means.

DETAILED PRESENTATION OF PARTICULAR EMBODIMENTS

Figure 1:
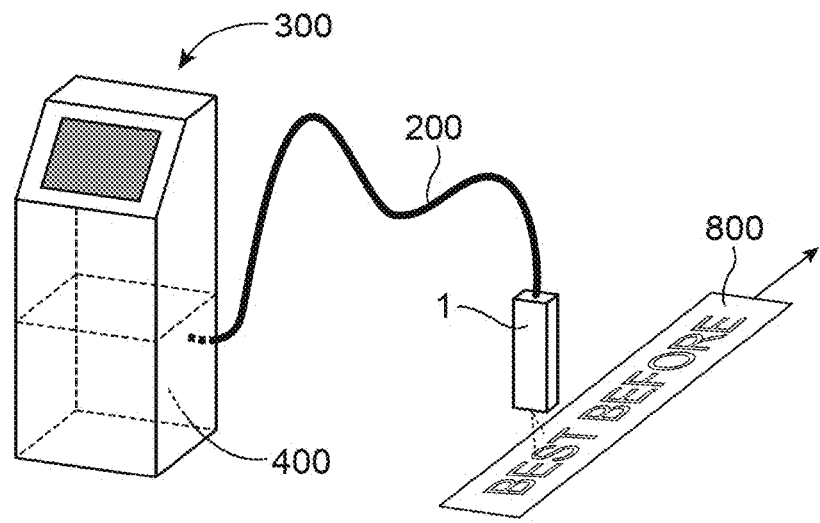
FIG. 1 is a perspective view of an inkjet printer known in prior art.

A first aspect of the invention will be explained with reference to FIG. 4A, on which reference 20 designates a filter through which a flow passes composed of vapour and droplets.

This filter comprises an inlet face 21 and an outlet face 22. The flow originates from a ink reservoir 10 of an inkjet printer. This flow can be high because, as mentioned above, it can be as much as several tens of litres per hour or several hundred litres per hour for a binary continuous jet printer.

At the outlet from this filter, the medium is composed of vapours and droplets (of vapour condensate). There may also be entrained droplets containing particles; these particles may be among particles collected by filter fibres separated by the presence of humidity from the solvent; evaporation of this humidity can return aerosols in the gas flow downstream from the filter.

The liquid that is deposited or that condenses at the inlet surface 21 of the filter can be eliminated from this inlet surface before it has passed through the filter 20. It is evacuated through one or several conduit(s) 25, for example to return to the ink reservoir 10, or to be directed to a device such as an evaporator (then to the ink reservoir 10), as explained below. This is the case particularly when the entrainment force towards the internal part of the filter (that is dependent on the flow velocity) is smaller than the force due to gravity, Preferably, a non-woven multi-layer fabric made of glass fibres (or nano-fibres) is chosen. Such a filter is chemically compatible with solvents currently used in inkjet printers. A Teflon or polypropylene filter could also be used. As a variant, it would also be possible to use a filter made of a woven material, but the average fibre diameter would be larger.

For example, the thickness of the filter 20 can be between 100 μm and 1 mm, and for example approximately 400 μm.

Also preferably, the air filter is compatible with the solvent.

"EPA" (Efficiency Particulate Air) filters, "HEPA" (High Efficiency Particulate Air) filters and "ULPA" (Ultra Low Penetration Air) filters satisfying standard NF EN1822, can be used. For example, reference can be made to http://www.boutique.afnor.org/norme/nf-en-1822-5/filtres-a-air-a-haute-efficacite-epa-hepa-et-ulpa-partie-5-measure-de-l-efficacite-de-l-element-filtrant/article/619183/fa157748.

Fibre diameters are preferably between a few nanometers and a few micrometers, for example between 5 nm and 5 μm or 10 μm, to satisfy the need for efficient blocking of particles while maintaining an acceptable head loss. The distribution of pore sizes depends on the method of manufacturing the filter material. SEM observations show that the pore size in a layer is of the order of 1 μm. It is difficult to estimate the real size of pores, considering that the filter material is made by superposing several layers. The filter material can create paths that force particles to follow very sinuous trajectories, which stimulates the interception mechanism. An unwoven structure has a very wide variety of porosities depending on the distribution of fibre diameters, thus porosities of between less than 1 μm and a few tens of μm are observed (for example 10 μm). It is interesting to use this type of material (unwoven) because, starting from a given thickness equal for example to about 400 μm, random porosities will create a resemblance between the different sinuous passageways and, through the mechanism that we described above (interception/impact, etc.), will stop almost all particles within the range of diameters of interest (about 300 nm), and will block larger particles (by the sieve and filter effect).

Figure 4A:
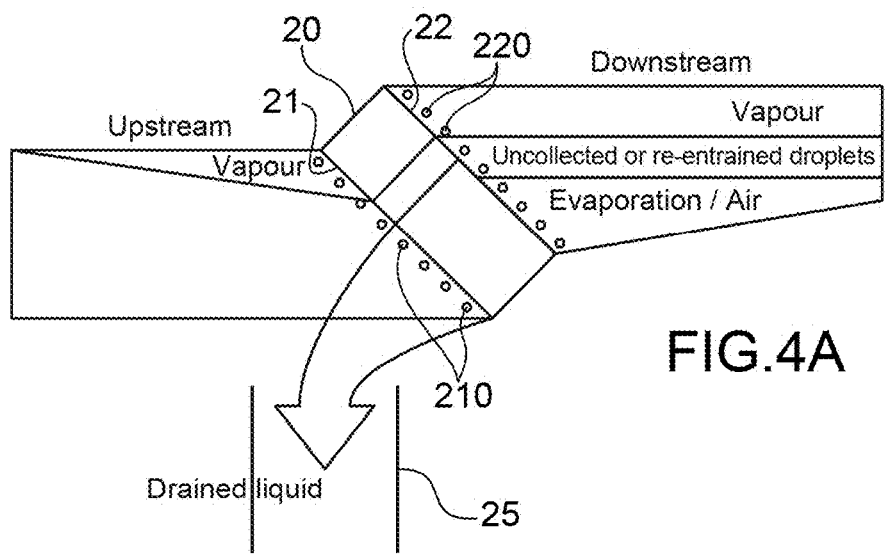
FIG. 4A represents a filter and evacuation, at, or from, the front face of the filter, of the humidity deposited on said front face, before it passes through the filter.

Refer to the course given in:
http://cerig.pagora.grenoble-inp.fr/tutoriel/non-tisse/page01.htm As indicated in FIG. 4A, the filter 20 defines a plane that can be inclined from a horizontal direction by an angle α, for example between 10° and 80°, for example between 40° and 60° (or between 30° and 80°). In general, recovery of humidity from the front face of the filter due to the action of gravity, is facilitated if the inlet surface 21 of the filter is inclined downwards during use of the filter, and the outlet face 22 is facing upwards. This is why means are provided to keep the filter inclined, such that humidity deposited on the front face can flow by gravity.

As a variant, the angle α can be zero (in which case the filter is practically horizontal), which facilitates the recovery of liquid from the inlet face of the filter.

Figure 4B:
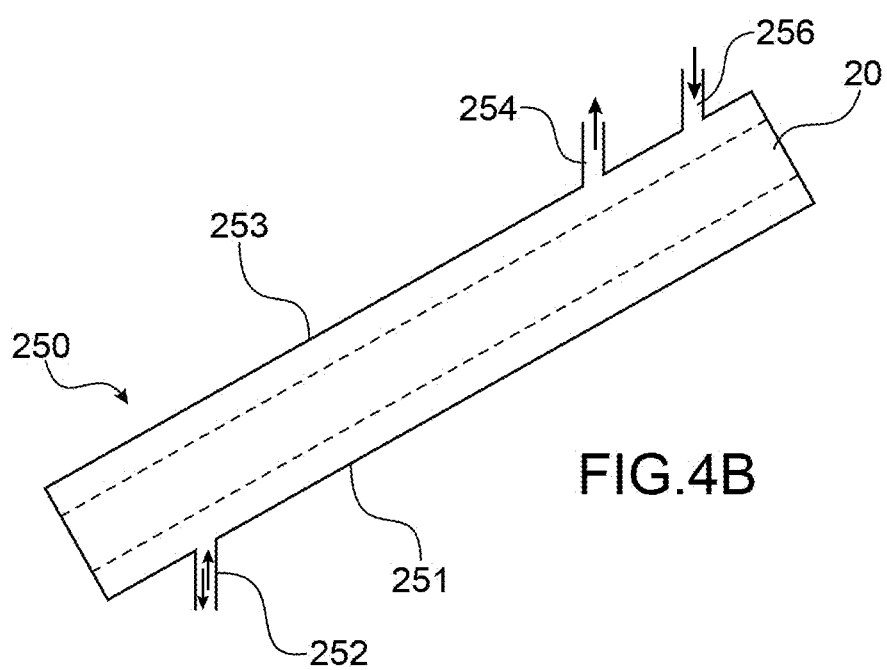
FIG. 4B represents a housing for a filter according to the invention.

FIG. 4B shows a housing 250 in which the filter can be maintained. This housing comprises a $1^{st}$ face 251 called the inlet face, and a $2^{nd}$ face 253 called the outlet face. It comprises an inlet channel 252 on the inlet face that also acts as an outlet channel for humidity that is deposited on the inlet surface of the filter and that is evacuated. It comprises an outlet face 253, an outlet channel 254 and an inlet channel 256 on the same side, for example close to the outlet channel 254, so as to introduce a cleaning and rinsing flow as explained below. This housing can contain a filter 20 represented in dashed lines in FIG. 4B. Means (support, arms; etc.) not shown keep the housing in the required position.

The housing 250 plays a confinement role, and also provides leak tightness, directivity and thermal and mechanical stability.

FIG. 5A represents an environment in which a filter of the type described above can be used.

This FIG. 5A shows the print head 1 and the catcher 7 that are shown diagrammatically.

Reference 10 designates an ink reservoir into which ink not consumed during printing will be directed from the catcher 7.

This figure and subsequent figures show a single reservoir 10 and a single print head 1, but a device or a method according to the invention can be equally applicable to the treatment of a flow from several reservoirs 10 that recover ink and/or solvent from one or several print heads. For example, at least 2 reservoirs like reservoir 10 can be supplied in parallel at the outlet from the catcher 7, and this supply can be provided by a pump. Similarly, the atmosphere or the gas treated by a system or a method according to the invention can be sent to one print head (as described above), or to several print heads.

As explained above, the volume of the print head 1 communicates with the exterior through the orifice or the slit through which the jet(s) pass to enable printing. An air exchange occurs with the atmosphere outside the head, though this slit or this jet outlet orifice; more precisely, gas containing solvent vapour escapes through this channel, while external gas is mechanically sucked into the head through the same pathway to compensate for the lost flow; this suction will introduce humidity into the system.

A flow 11 of vapours from this reservoir 10 is directed to the filter 20. In return, a liquid flow that is condensed on the inlet surface 21 of the filter is carried to the reservoir 10 by ducts such as means 25, 252 shown diagrammatically on FIG. 4B.

At the outlet from the filter, the flow of filtered vapours is directed to the solvent extraction means 26 (for example condensation means), that will condense solvent vapours and produce clean gas 35 that can be returned to the print head 1. It is said that the filter is positioned upstream from the means 26, since the vapours 11 to be treated firstly pass through the filter, and the filtered flow 27 is then directed to the means 26. The solvent extracted (for example by condensation) can then be carried to the reservoir 10 through an evacuation line 29 that could be provided with a pump 28. In this case and in the other embodiments presented in this application, the solvent extraction means used may be any means of denaturing a solvent in a gas flow containing it, or any means of extracting a solvent from a gas flow or lowering the concentration of solvent in such a flow, for example by membrane separation or adsorption. The remainder of this description applies to condensation means (or a condenser) but all these other examples of solvent extraction means can be used to produce solvent extracted from the gas flow and a gas flow with a reduced solvent concentration.

Part of the liquid solvent resulting from condensation in the condenser 26 can be used to be transferred through a line 31 that can be fitted with a pump 30, to the outlet face 22 of the filter in preparation for a cleaning operation of this filter.

Clean gas 35, output from a gas storage or reservoir 37 can be sent through a line 33 and a pump 32, to the outlet face 22 of the filter 20, for a drying operation after a possible cleaning operation.

The pumps and the valves, if any, can be controlled by means forming the printer controller and programmed for this purpose.

The parts of the pathways 31, 33 closest to the filter 20 can be coincident.

A filter cleaning method according to the invention can be used. Such a method can regenerate a spent filter that can be clogged by solid and/or liquid aerosols, to prolong its life.

To achieve this, the supply to the filter by a flow 11 from the reservoir 10 is cut off. For example, the atmosphere on the side of the inlet face 21 of the filter is brought to atmospheric pressure so that the flow 11 no longer passes through it.

The filter is then rinsed by injection of solvent through its outlet face 22. This solvent will pass through the filter 20 and act so as to take away polluting elements that could be trapped in its mass. The dirty solvent flow output from the inlet face 21 can then be sent to the ink reservoir—for example passing through a separator (as described below) so that the evaporated solvent, and the dry material contained in the solution, can be returned to its source. Preferably, this is done using some of the purified solvent that can be recovered from the condenser 26 (through the line 31 and the pump 30 in FIG. 5A). According to one embodiment, when the filter is inclined at an angle α (as illustrated for example in FIG. 4A), the solvent can be carried to the highest end of the outlet face 22, from where it can run down over this entire face 22.

The filter can then be dried, for example using the compressed air source 37 and possibly a pump 32.

During these cleaning operations, the inclination of the filter symbolised by the angle α that can be seen on FIG. 4A, can play a role: if the filter is almost vertical (for example angle α between 60° and 90°), or if it is almost horizontal (for example angle α between 0° and 30°), one of its ends might not be cleaned, particularly if a technique such as runoff (or run down) described above is used for cleaning. The angle α for these cleaning operations is preferably between 30° and 80°. A variable angle can be provided depending on the operations to be done, for example: 0° during filtering, then 60° during cleaning.

A variant of part of the device in FIG. 5A is shown in FIG. 5B. This is the pathway that carries vapours from the reservoir 10 to the filter 20. In the structure in FIG. 5B, a separator 40 is placed between the reservoir 10 and the filter 20. For example, this separator functions by inertial precipitation. It can separate the largest particles contained in the atmosphere arriving from the reservoir 10. Thus, vapours from which the largest particles or pollutants have been removed are sent to the filter 20. The remainder of the system can be as described with reference to FIG. 5A.

A variant of part of the devices in FIGS. 5A and 5B is shown in FIG. 5C. In this case, two filters 20, 20a are used in parallel. This type of assembly can allow the use of one filter while a cleaning procedure is being applied to the other filter, as described above.

To achieve this, each filter (that can be contained in a individual housing like that described above with reference to FIG. 4B, fitted with connections to connect fluid supply and return conduits), can be supplied through a conduit 11, 11a from the reservoir 10 or the separator 40. Each filter is associated with an outlet conduit 27, 27a that is connected to an inlet of a three-way valve 45, the output of which carries the gas flow selected by the valve 45 away to the condenser 26, through a conduit 27'.

Each filter may be associated with a 1st return pathway through which the cleaning fluid (purified solvent) can be sent to the outlet face 22, 22a of the corresponding filter and/or with a 2nd return pathway through which clean rinsing gas can be sent to the same output face 22, 22a of the corresponding filter, so that the cleaning or rinsing operations as described above can be performed, if necessary.

The filter towards which the rinsing/drying liquid/gas will be sent is selected by means 47 (for example a valve or a solenoid valve), the inputs of which are supplied through the pathways 31, 33 that are, connected to the condenser 26 and to the line through which the gases output from the condenser 26 circulate after treatment in the condenser, respectively.

Such a system makes it possible to use filters 20, 20a alternately, and also clean them alternately. If a $1^{st}$ filter requires a cleaning operation, the $2^{nd}$ filter is changed over (or switched) using means 45, into a working situation (to filter vapours from the reservoir 10 or from the separator 40), and the $1^{st}$ filter can be cleaned simultaneously as described above and then once again changed or switched over to the filtering situation while a cleaning operation is performed on the $2^{nd}$ filter. This alternation can be programmed by a clock with constant time intervals, and/or by means forming the printer controller programmed specially for this purpose.

Both filters 20, 20a are connected to the reservoir (not illustrated on FIG. 5C) and therefore communicate with the same atmosphere.

The set of the two filters in FIG. 5C can be combined with the means already described above with reference to FIGS. 5A and/or 5B.

Figure 6A:
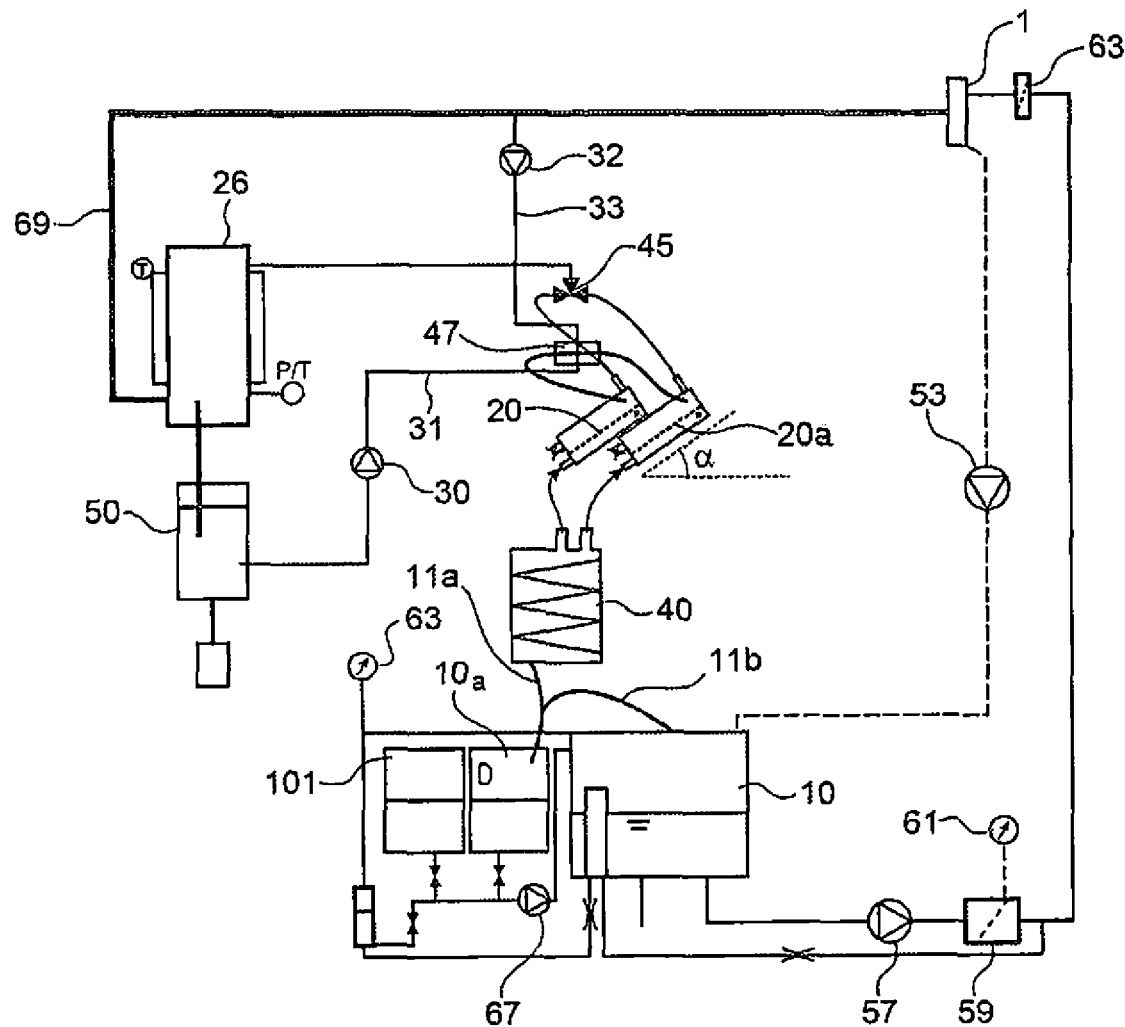
FIGS. 6A and 6B represent embodiments of a solvent recovery system according to the invention, with two filters (FIG. 6A) and with a single filter (FIG. 6B) upstream from the solvent extraction means.

FIG. 6A represents an embodiment of a system using 2 filters 20, 20a, for example made of glass fibres, that are used in alternation.

On this figure, references identical to references in the previous figures designate identical elements or elements performing the same technical function.

Both filters 20, 20a are connected to the separator 40 and therefore communicate with the same atmosphere. On this figure, the reference 50 designates a buffer volume in which condensation products from the condenser 26 are recovered. This volume 50 can use a pump 30 to supply filters 20, 20a ready to clean them, as described above. Reference 101 designates a storage volume for an additive (for example solvent) in case a loss has to be compensated using an additive; a pump 67 pumps additive from this storage volume to add to the ink in the reservoir 10.

The reservoir 10 can be supplied with recovered ink pumped using a pump 53 (for example a diaphragm pump) from the gutter in the print head 1. The flow in the recovery line is two-phase, with a flow equal to for example between 0.3 and 10 litres/hour of liquid, and between 10 and 10000 litres/hour of gas, for example 1000 l/hour. This two-phase flow is generated by the pump 53. The flow in this pathway and the ink reception mechanism (reception of the two-phase flow from a pipe in the ink reservoir 10 create more or less from splashing—that in particular can release large particles) can generate various sizes of aerosols, as described above.

The reservoir 10 can supply the head 1 with ink through the pump 57 and a first filter 59 then a second filter 63, close to the print head. A sensor 61 measures the pressure in the supply pathway to the head 1.

The gas flow is then carried due to the positive pressure in the reservoir 10, to the filter 20 or 20a connected with the open pathway of the 3-way valve 45. This valve may for example be controlled using a predefined clock.

The gas flow is filtered in the selected filter 20 or 20a and is then directed to the condenser 26 through the open pathway of the valve 45. A mechanism for separation of condensates from desaturated air carries the condensates in the buffer volume 50, and air through the return line 69, to the print head 1.

Another pathway starting from the buffer volume 50 directs a calibrated quantity of condensates through a pump 30 and controlled valves 47, to the filter 20, 20a waiting for maintenance (this is the filter for which the pathway from the 3-way valve 45 is closed). Therefore the solvent flow follows a path opposite the path followed by vapours output from the reservoir 10 or the separator 40 and that have to be treated by one of the filters 20, 20a. Therefore this solvent flow passes firstly through the downstream side 22, 22a of the membrane and then the filter body, and is then directed to the upstream side 21, 21a, cleaning particles deposited on the surface 22, 22a and in the depth of the filter membrane. The dirty (but very dilute) solvent then passes through the separator 40 in counter current to the gas flow (that rises to the filter in service). This solvent flow is thus useful to clean the separator 40 to remove deposits of dry extracts deposited in it during the filter process.

It may be useful (in this case and in other embodiments of the invention) to provide separation between rising vapour (from the reservoir 10) and the drainage (descending) from the separator 40 to a second reservoir 10a; a junction "settles" or decants the liquid so as to avoid directing it to the reservoir 10 (to avoid disturbing the viscosity in this reservoir 10). According to the embodiment illustrated, a $1^{st}$ conduit 11a is followed by the liquid flowing from the separator 40 to the second reservoir 10a; a $2^{nd}$ conduit 11b channels the gases to be treated from the reservoir 10 and joins the $1^{st}$ conduit 11a such that the gases continue to be channelled to the separator 40 but the liquid from the separator cannot pass along the $2^{nd}$ conduit 11b. For example, the assembly is in the form of a "Y", the bottom of the "Y" being oriented towards the second reservoir 10a and one of the 2 branches being connected to the separator and the other to the $1^{st}$ reservoir.

After the liquid has passed through the filter during rinsing, another pump 32 connects the desaturated gas pathway to the filters; this gas is directed by two valves 47, for example controlled according to the preconfigured clock. This drying mechanism can also open pores of the filter membrane after having rinsed it.

The desaturated gas thus drawn off is returned to the separator, then to the filter that is not in the maintenance phase.

Consequently, the air flow used starting from line 69 to dry one of the filters in maintenance, circulates in a local loop, which will not have any impact on the net flow transferred to the head 1. Air drawn off by the pump 32 will generate a surplus flow through the filter in maintenance, and is then transferred to the condenser 26 and returned to the line 69, which compensates for the deficit generated by the pump 32. Air drawn off by the pump 32 also generates an overpressure in the reservoir 10 and/or in the separator 40, but also in the other filter, through which a higher flow rate circulates since both filters communicate with the same atmosphere (through the separator 40 in this example). As a variant, air can be brought in from the exterior and then transferred by pumping to the required filter in preparation for drying.

The intensity of this gas flow in the local loop is preferably controlled to minimise the pressure fluctuation in the reservoir 10 and in the gas flow to the return from the print head 1.

The maintenance action is thus completed. The function of the cleaned filter is regenerated, and this filter is ready to filter gas from the reservoir 10.

The 3-way valve 45 controls the changeover of the gas flow to the filter to be cleaned, and the maintenance function described above on the used filter can begin, to take advantage of the low head loss when the filter is fresh.

With this 2-filter system, the printer can continue to function (the printing operations continue to be performed) without being hindered by cleaning operation on one filter: air continues to be filtered by the other filter and the head 1 can be supplied by air drawn from the output from condenser 26 as explained above; therefore filtering can be continuous, with one filter filtering while the other is being cleaned, and vice versa.

A cleaning method can be applied in the case of a system provided with a single filter 20, as illustrated in FIGS. 5A and 5B. In this case, a filter sequence using the filter 20 is followed by a cleaning sequence that is followed by another filter sequence, etc. The recovery circuit of vapours that exit from the filter can be provided with the condenser 26, but also with the buffer reservoir 50, and means 30, 31, for returning solvents recovered in this buffer volume 50 to the filter 20 or the reservoir 10 (a further pump and a duct can be implemented to transfer solvents from reservoir 50 to reservoir 10) respectively. Similarly, the conduit 69 that supplies the head 1 is located at the exit from the condenser 26; the compressed gas reservoir 37 and the pump 32 if there is one, dry the single filter 20 during a rinsing operation subsequent to cleaning.

Figure 6B:
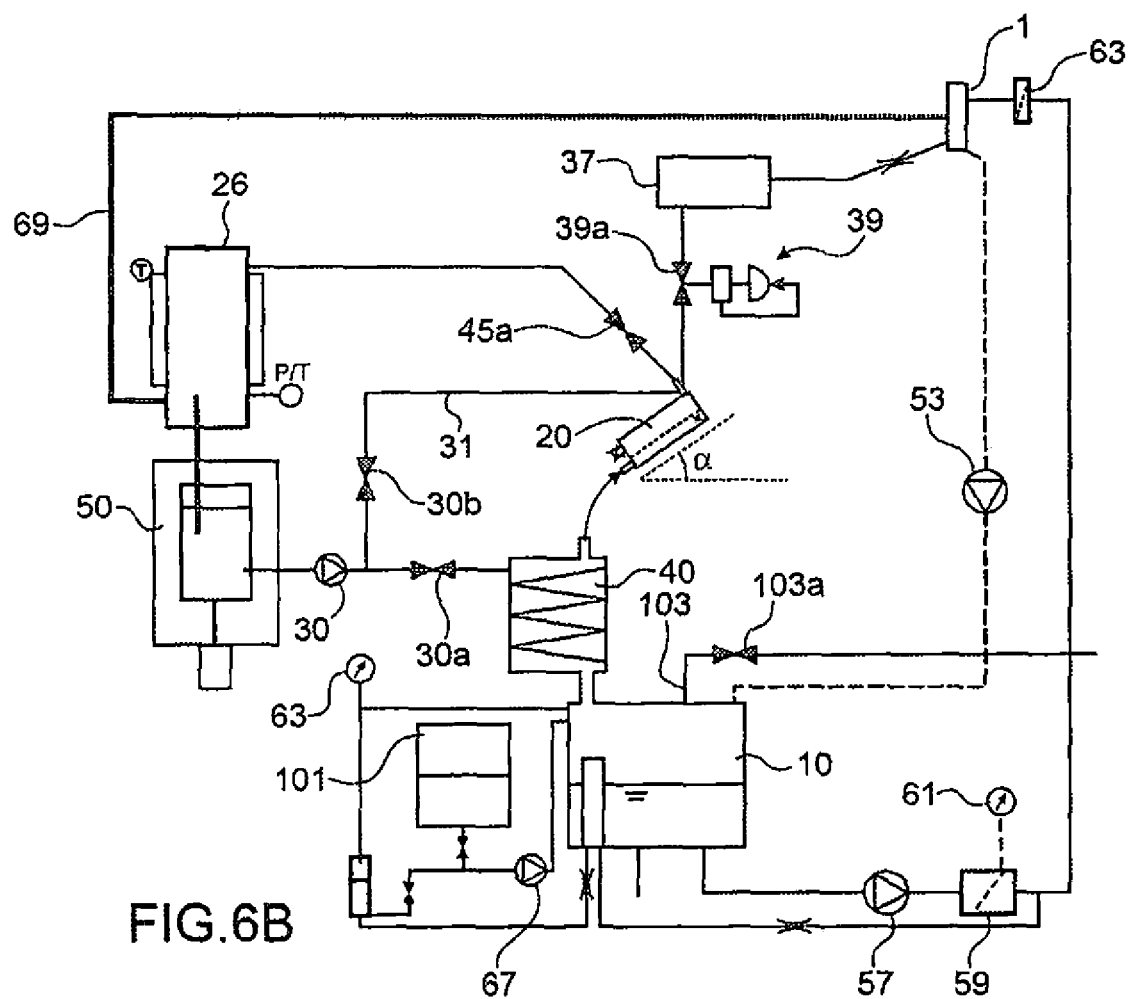

A system with a single filter can include means 53, 57, 59, 61, 63, 101, 10a, 11a, 11b described above with reference to FIG. 6A. FIG. 6B represents a variant embodiment of FIG. 6A, with a single filter. Therefore the system is simpler. The elements in FIG. 6B have already been described above, with FIG. 6A or with FIG. 5B (and particularly the external gas source 37). However, filtering cannot be continuous in this case, since operation of the filter is interrupted for cleaning using solvent recovered from the condenser.

A depressurisation path 103 is provided on the side of the ink reservoir 10 to balance the pressure between the different parts, during the filter maintenance phase. The valve 103a is then opened and the reservoir 10 is at atmospheric pressure. The printing machine can then continue to print.

The solvent from the reservoir 50 can be sent to the reservoir 10 through the separator 40 (valve 30a opened, valve 30b closed) or to the filter 20 to clean the filter (valve 30b opened, valve 30a closed).

The flux drawn off in the compressed gas reservoir 37 can be adjusted using a valve 39a, and preferably a proportional valve 39, 39a. Compressed gas from this reservoir 37 can be used to supply the head 1.

Figure 7:
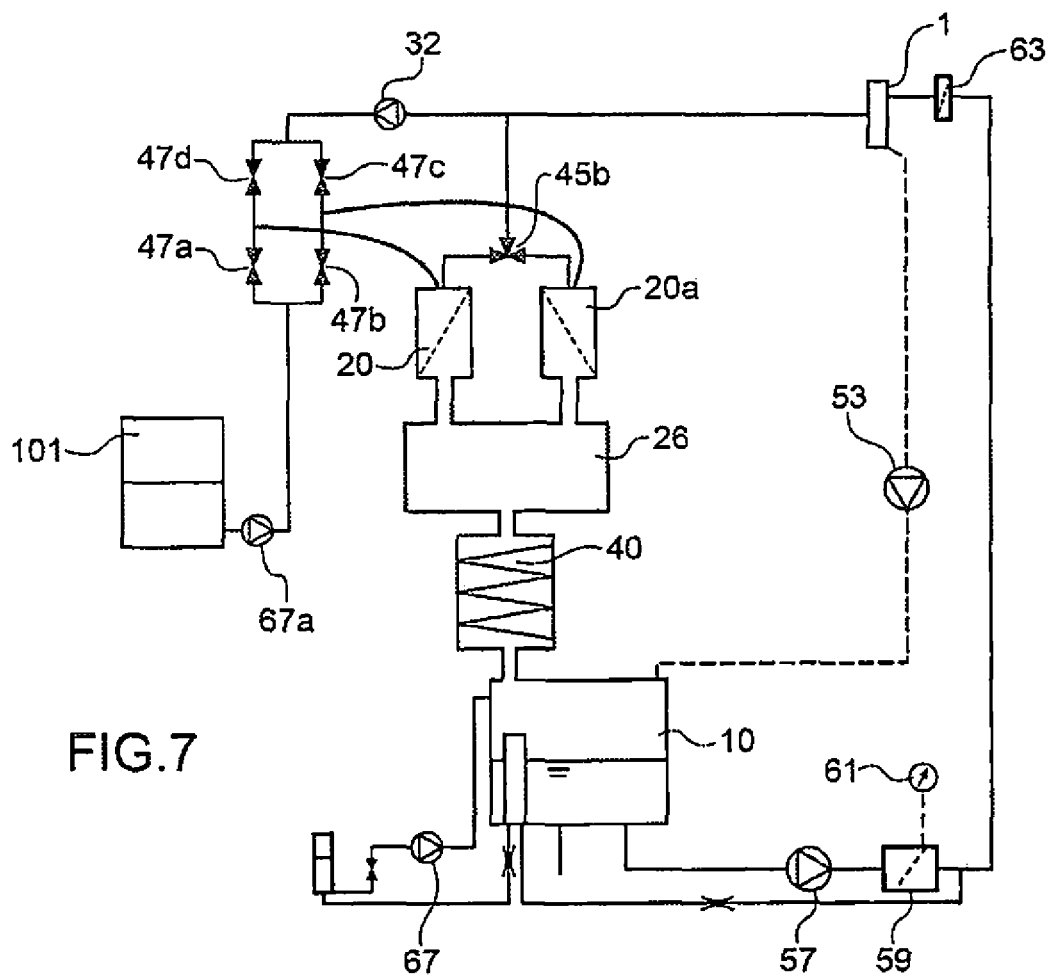
FIG. 7 represents an embodiment of a system for recovery of solvent according to the invention, with 2 filters on the downstream side of the solvent extraction means.

FIG. 7 represents an embodiment of a system using two filters 20, 20a, for example made of glass fibres, that are used in alternation, but that are located downstream from a condenser element.

On this figure, references identical to references in the previous figures designate identical elements or elements performing the same technical function.

In this embodiment of the invention, air or the atmosphere returned from the reservoir 10 is firstly desaturated by the condenser 26 before being filtered by one or the other of the filters 20, 20a.

The outlet from each filter is sent to the print head 1 through an output valve 45b that is a 3-way valve in the example shown. This valve may for example be controlled with a predefined clock.

In this type of system, condensation originating from the front face of the filter according to the diagram shown in FIG. 4A, is firstly recovered by the condenser 26 and then by the separator 40 before being redirected to the reservoir 10.

The additive reservoir 101 is used to transfer clean solvent to one or the other filter 20, 20a during a cleaning operation using pump 67a, as explained above; a set of valves 47a-47d directs the solvent to one filter or the other filter.

The solvent flow then follows the path followed by vapours outlet from the condenser 26 and that are to be treated by one of the filters 20, 20a, in the reverse direction: therefore it passes firstly through the downstream side of the membrane 22, 22a, then the filter body, and is then directed to the upstream side 21, 21a, cleaning particles deposited on the surface 22, 22a and in the depth of the filter membrane. The dirty solvent is then sent to the condenser 26 after passing through the filter that has just been cleaned.

After the liquid has passed through the filter during rinsing, a pump 32 sends the desaturated and then filtered gas once again to one filter or the other filter; this gas is directed by valves 47a-47d, for example controlled according to the preconfigured clock. As in the previous examples, this drying mechanism can also open pores of the filter membrane after having rinsed it.

The maintenance action is thus completed. The function of the cleaned filter is regenerated, and this filter is ready to filter gas from the condenser 26.

The 3-way valve 45b sends the gas flow from the cleaned filter to the head 1, and the maintenance function of the other used filter can begin.

As in the case in FIG. 6A, with this 2-filter system, the printer can continue to function without being hindered by cleaning operations on one filter: air continues to be filtered by the other filter and the head 1 can be supplied by filtered air as explained above; therefore filtering can be continuous, with one filter filtering while the other is being cleaned, and vice versa.

But in this configuration with filters located at the outlet from the condenser 26, cleaning of the filter must be more frequent than when the filters are located at the inlet to the condenser 26, since the filters do not benefit from the action of a wet flow and therefore self-cleaning.

A system can also be made (not shown) using a single filter 20; for example made of glass fibres, located downstream from a condenser element 26. As in the case in FIG. 6B, in this case filtering cannot be continuous since operation of the filter is interrupted for cleaning by the solvent from the solvent reservoir 101. A compressed gas reservoir like the reservoir 37 in FIGS. 5A and 6B, supplies a drying gas flow after cleaning by solvent. Once again, the filter is cleaned more frequently than when the filter is located at the inlet to the condenser 26, because it does not benefit from the action of a wet flow.

In general, when a device or a method according to the invention is used, it is preferred to keep the concentration of solvent vapour in the gas flow equal to a value lower than the saturation level at the lowest temperature that can be found in the processing loop. A gas phase flow in this loop does not in any way compromise the treatment mechanism disclosed according to the invention. To achieve this, it is preferred to simply prevent condensation in the part of the circuit downstream from the extraction means 26 and as far as the head 1, rather than to condense everything. The maximum concentration that should preferably not be exceeded can be chosen to be equal to the saturating concentration at the temperature at the coldest point (always in the downstream circuit). In other words, if the coldest point encountered by the gas flow is located in the extraction means 26, there can be no condensation downstream from these means 26. Adapted thermal means will make it possible to satisfy this temperature condition.

Comparative tests will be presented, making use of the systems described below. These tests make it possible to understand the efficiency and the advantages of a filter system according to the invention.

The ink used is either black ink with colorant, or white ink with pigments.

The reservoir 10 is fitted with a pressure sensor so that tests can be carried out on the structures described above. The pressure measurement thus obtained is a direct measurement of the head loss due to the filter 20. When the filter becomes clogged, it will generate head losses that will pressurise the reservoir. For example, the pressure sensor can be a GE UNIK 5000 type instrument (measurement range: 0-5 bars) with a sampling frequency of 0.5 Hz.

Furthermore, the filters were observed under a scanning electron microscope (SEM), that forms a qualitative means of evaluating their operation. The zoom level is adjusted to observe the fibrous structure of the filter, but also the particles that are deposited on it.

The different results obtained for the different usage conditions described above, are presented below.

In the case of a structure like that in FIG. 7 with the filter downstream from the condenser 26, after 48 hours of operation with a black ink with colorant without any maintenance, particles intercepted by the membrane form a "cake" on the side of the inlet face 21 of the filter that increases the filtration capacity, but also increases the head loss, until it becomes incompatible with the operation of an inkjet printer. The output face 22 remains clean which confirms the efficiency of the filter, even during the phase in which the head loss was low; in other words, by observing the cleanliness on the surface at the filter outlet, it can be concluded that this material is efficient before the cake is formed.

Figure 8:
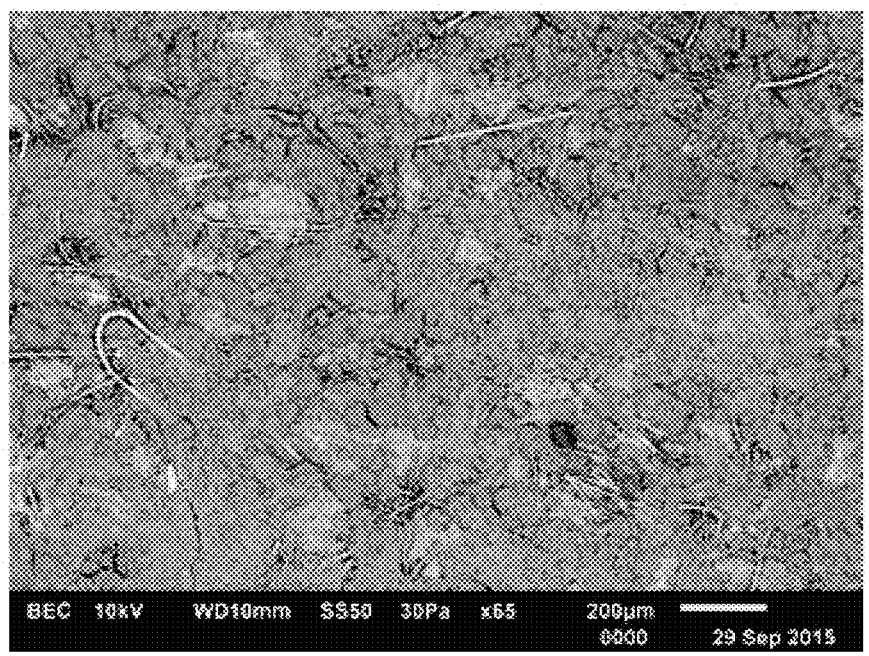
FIG. 8 represents an example of an SEM image of the inlet face of a filter after 48 h of operation, in the case in which the filter is placed on the downstream side of the solvent extraction means.

An SEM photo of the inlet face of this membrane (FIG. 8, magnification 45) also after 48 hours of operation without maintenance with a black ink with colorant, confirms that the filter is almost clogged by particles with diameters varying from a few tens of nm to a few hundred nm. Cleaning according to the invention that is more frequent than in a structure in which the filter is placed upstream from the condenser 26 can then by done.

Figure 9:
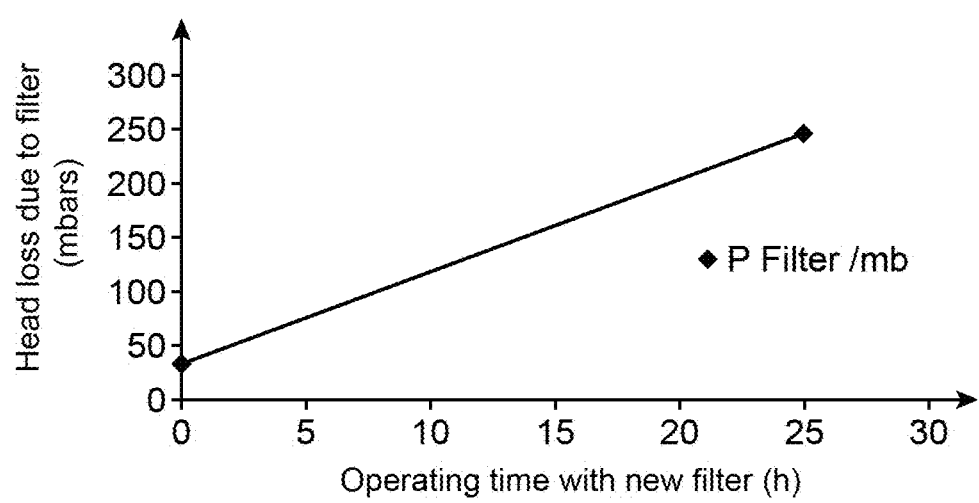
FIG. 9 represents the variation of the head loss in the case in which the filter is placed on the downstream side of the solvent extraction means.

It will be noted that the increase in the head loss through this filter shown diagrammatically in FIG. 9, reaches a level of 250 mbars in 24 hours. Theory predicts that this trend continues with the formation of the cake of filtered particles. The filter thus becomes hermetically sealed for the gas flow. This test was not done with a pressure sensor at all times, which explains why there are not many points on FIG. 13.

Therefore a filter positioned on the return path to the head after the condenser clogs more quickly; consequently, cleaning is done earlier than in a structure with a filter placed before the condenser.

Figure 10A:
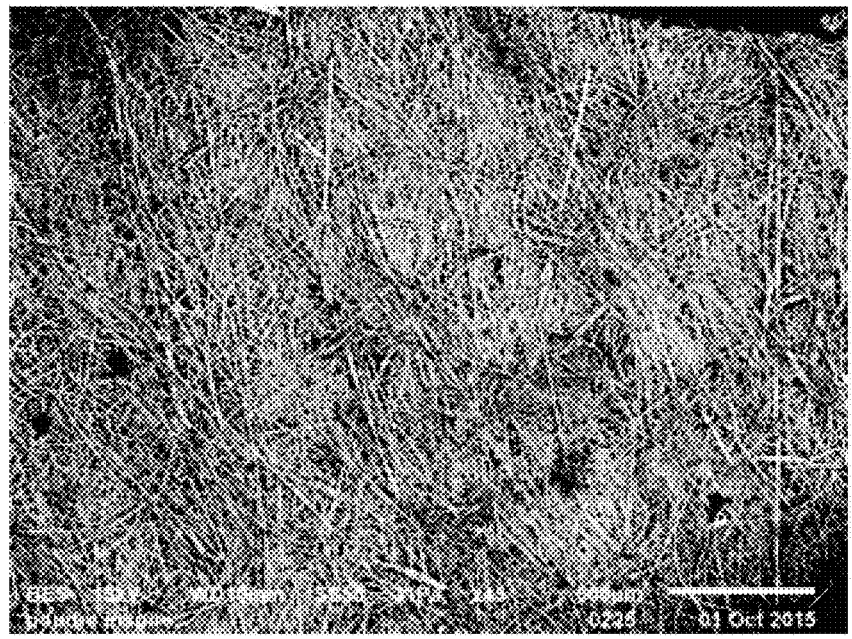
FIGS. 10A-10B represent examples of SEM images of the inlet face of a filter after 20 h of operation, in the case in which the filter is placed on the upstream side of the solvent extraction means.

In the case of the structure in FIG. 5A (filter upstream from the condenser), after 20 hours of operation with black ink with colorant, it is seen that the open part of the membrane (FIG. 10A: SEM photo with magnification of 45) remains practically identical to the open part of a new filter. Pollution zones are local, or in the form of clumps or clusters (FIG. 10B: SEM photo with magnification of 3500).

Figure 11:
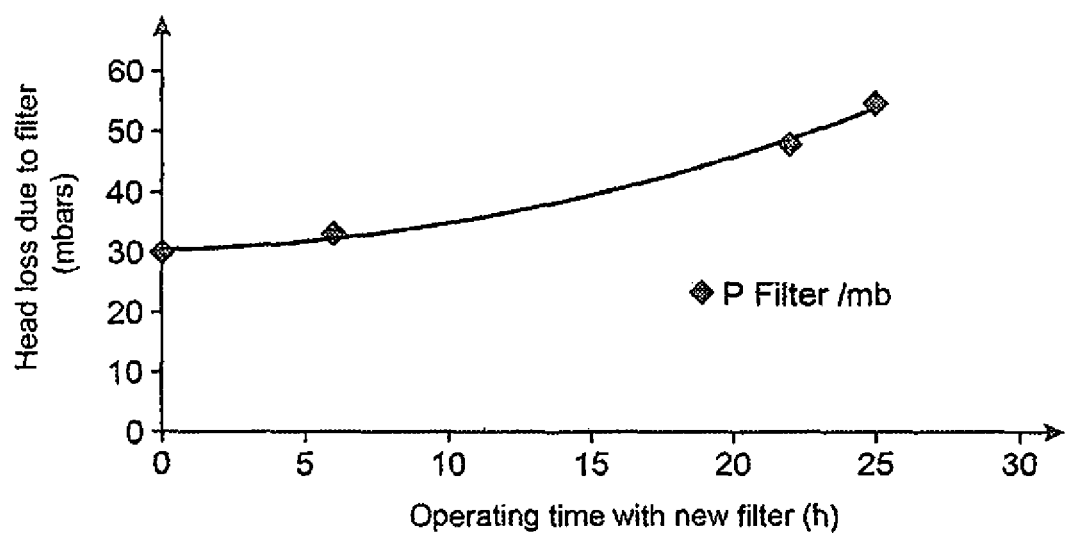
FIG. 11 represents of the variation of the head loss in the case in which the filter is placed on the upstream side of the solvent extraction means.

FIG. 11 shows the variation of the head loss due to the filter when it is located upstream from the condenser 26 and no maintenance is done on it, as a function of the operating time starting from a new filter. This figure clearly shows that the head loss increases relatively slowly. After about 24 h, the pressure in the reservoir is more than 80% lower than the pressure obtained when the filter is operating in dry mode, in other words when it is located downstream from the condenser as in FIG. 7 (compare the results in FIG. 11 with the results in FIG. 9).

It can be noted that the condensation process can already stop some of the particles; therefore it is preferably to make the filter operate in the wet state, in other words to use a filter placed upstream from the condenser 26; but as explained elsewhere, the filter can also be operated in a dry state, in other words a filter can be placed downstream from the condenser 26.

Globally, the head loss with the filter positioned upstream from the condenser, is not excessive. In the configuration using white ink with pigments (FIG. 12), but without separator 40, an oscillation phenomenon was also observed starting after about 5 hours of operation. This can provide first information about a limiting operating time of the filter (positioned upstream from the condenser) that can therefore, for example, be between 1 h and 10 h, or between 3 h and 7 h.

The increase in the head loss depends on the degree to which pores are closed off by the liquid, oscillation results from the accumulation phenomenon followed by evacuation downstream from the filter under the effect of pressure.

This oscillating phenomenon can be explained by an unstable state of operation of the membrane filter; the increase in the trans-membrane pressure is followed by a release, as if drainage took place through the outlet face 22.

Figure 12:
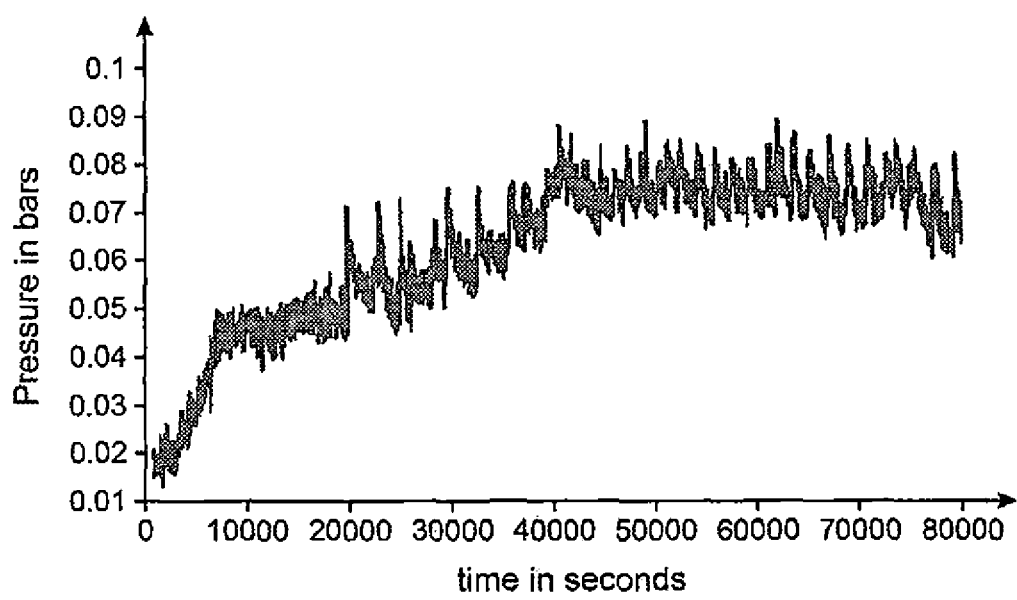
FIG. 12 represents a head loss oscillation phenomenon, corresponding to the moisture contents of a filter.

Various tests and observations confirm the above analyses. A direct supply of a wet flow to the membrane (droplets output from the reservoir 10, condensation created in the filter housing) saturates the membrane with solvent. If the opening of some of the pores of the filter still occasionally allows the gas flow to pass through (with a high head loss), depending on the rate of the supply of moisture, an "avalanche" effect can occur (in other words the reduction in pores correspondingly accentuates this reduction process by the increase in velocity, and makes drops migrate to the remaining pores that are still open). In the short term, it will cause complete closure of the passage area that will then be subsequently unclogged by the increase in the upstream pressure. FIG. 12 illustrates stabilisation of the head loss accompanied by a release of particles after about ten hours in the case of the configuration with a filter upstream from the condenser.

Figure 13:
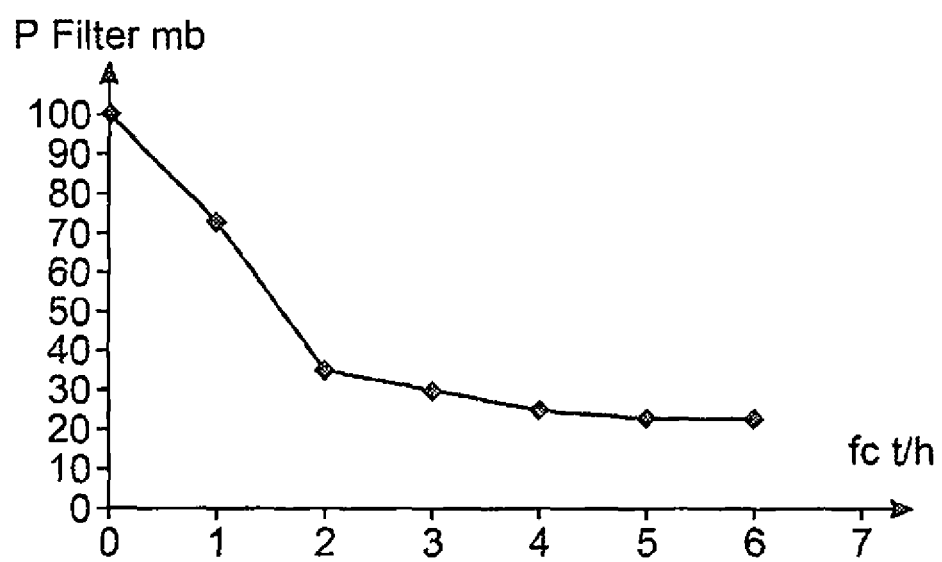
FIG. 13 represents the variation of the head loss after having started with a filter that has been rinsed but not dried.
Figure 14A:
FIGS. 14A-14D represent examples of SEM images of inlet and outlet faces of a filter, after 20 h of operation and with two different inks.
Figure 14B:
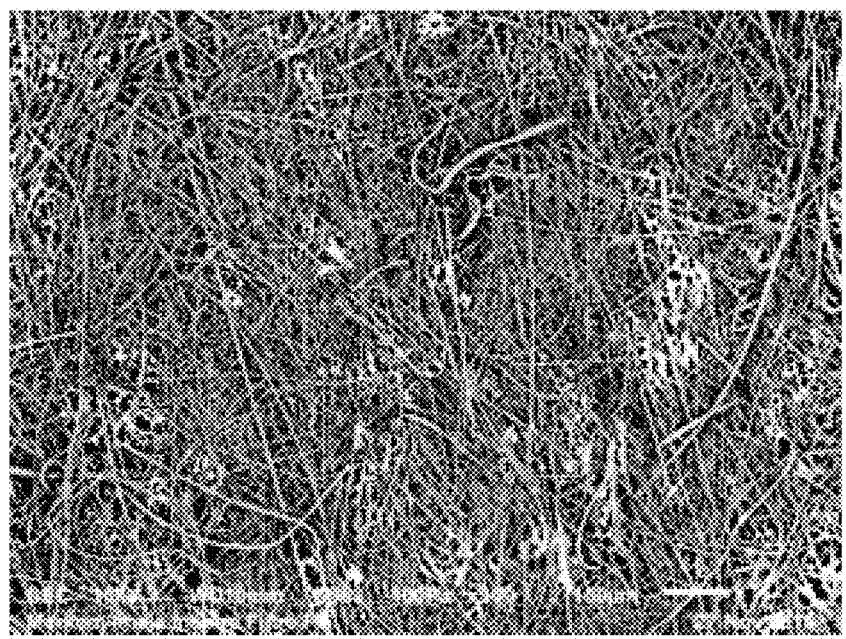
Figure 14C:
Figure 14D:
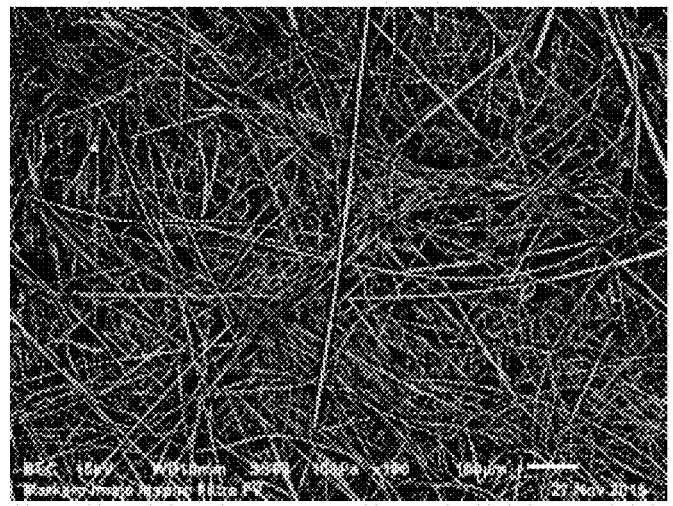

The variation in the head loss of black ink with colorant when the system (filtration system with filter upstream from the condenser) starts with a dry or dirty used filter from the previous day (see FIG. 13). In this case, stopping the system will lead to an increase in the head loss during the night. When restarting, the head loss is very high (about 100 mbars); and then the head loss reduces as the membrane absorbs humidity to return to the equilibrium state (about 20 mbars). Therefore it can be concluded that the pores are relatively open during operation, and that they close during the night due to drying.

2 inks were used for another test, with pigments and with colorants, to study maintenance parameters for regeneration of the filter, in the case of a configuration with 2 filters located at the outlet from the separator (but without condenser) and the rinsing method according to the invention described above.

SEM photos in FIGS. 14A-14D (magnification×100) show "rinsed" filters after having operated for more than 20 hours. The front face 21 in black ink (FIG. 14A) and white ink (FIG. 14B) and the back face 22 in black ink (FIG. 14C) and white ink (FIG. 14D) are observed.

Figure 15:
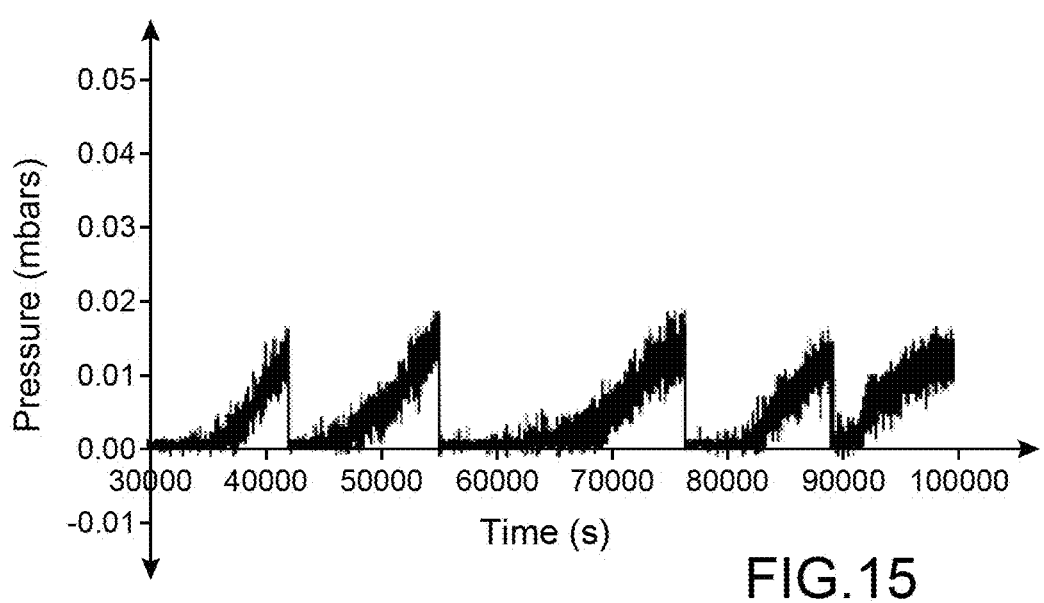
FIG. 15 represents the effect of a rinsing procedure on filters placed upstream from the solvent extraction means, on the transmembrane head loss

FIG. 15 illustrates the effect of rinsing on 5 cycles (regeneration of the filter function). The variation of the head loss takes place fairly similarly, suggesting that most of the filter function was restored after the rinsing operation.

This FIG. 15 shows that a filter can be restored several times after operation for a few hours, by rinsing with solvent and then by drying with dry air. It is observed that it is thus possible to maintain a head loss equal for example to approximately 15 mbars.

The time between two maintenance operations will generate a more or less significant head loss and may or may not initiate the release phenomenon. The filter area facing the gas flow is a parameter than needs to be integrated to guarantee a sufficiently low passage velocity (doubling the area will reduce the velocity to half, and the head loss to a quarter which stimulates, or is conducive to, the drainage phenomenon on the inlet face illustrated on FIG. 4A). Finally, the nature of the gas flow and particularly its content of droplets will use the filter differently; the quantity of droplets in the atmosphere that enters the filter has an effect on drainage and on the repeated release of impurities. If there are too many droplets, the filter is wetted more quickly which stimulates, or is conducive to, the repeated release phenomenon; the maintenance frequency then has to be increased.

Figure 10B:
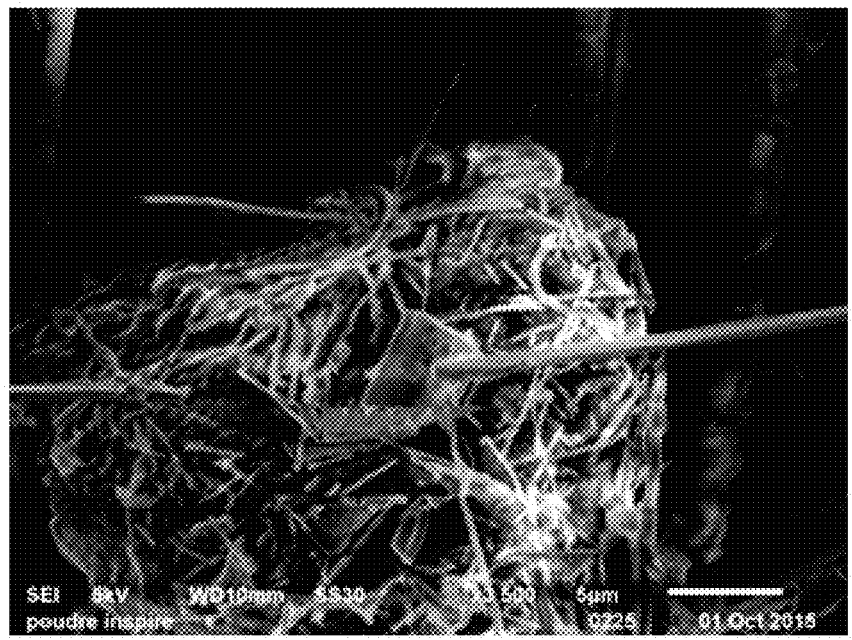

The behaviour of a filter 20 facing a gas flow saturated with solvent vapours and located upstream from a condenser 26, was studied above. FIG. 11 confirms the efficiency of drainage that is developed in this configuration by stabilising the head loss to a level of about 50 mbars after 24 h. FIGS. 10A-10B validate understanding of the drainage phenomenon because it is observed that the area of the filter membrane is almost unmodified and is always very open.

The impact of excessively high humidity on the filter has also been shown, see FIG. 12. It is found that installing a device 40 to separate droplets derived from condensation at the reservoir outlet 10 reduces the average level of head losses.

Figure 16A:
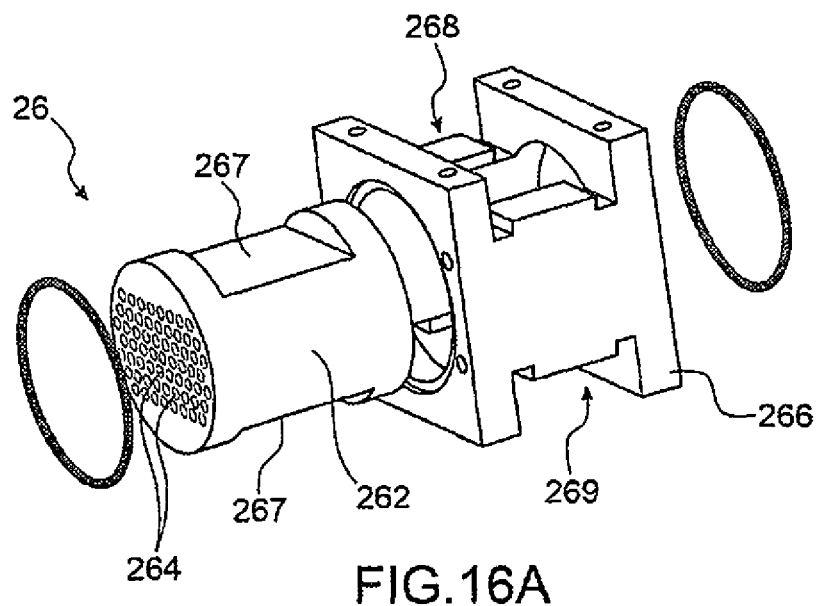
FIGS. 16A and 16B represent examples of condenser structures that can be used in the framework of this invention.

Concerning the condenser 26 that can be used in a system according to the invention, the condenser can be made in the form of a cylindrical drum 262 inside which a number of ducts 264 has been formed, as illustrated in FIG. 16A. The cylinder is machined laterally so as to define two plane faces 267 parallel to the axis of the cylinder and parallel to each other. These two plane faces will be used for cooling the module.

Figure 16B:
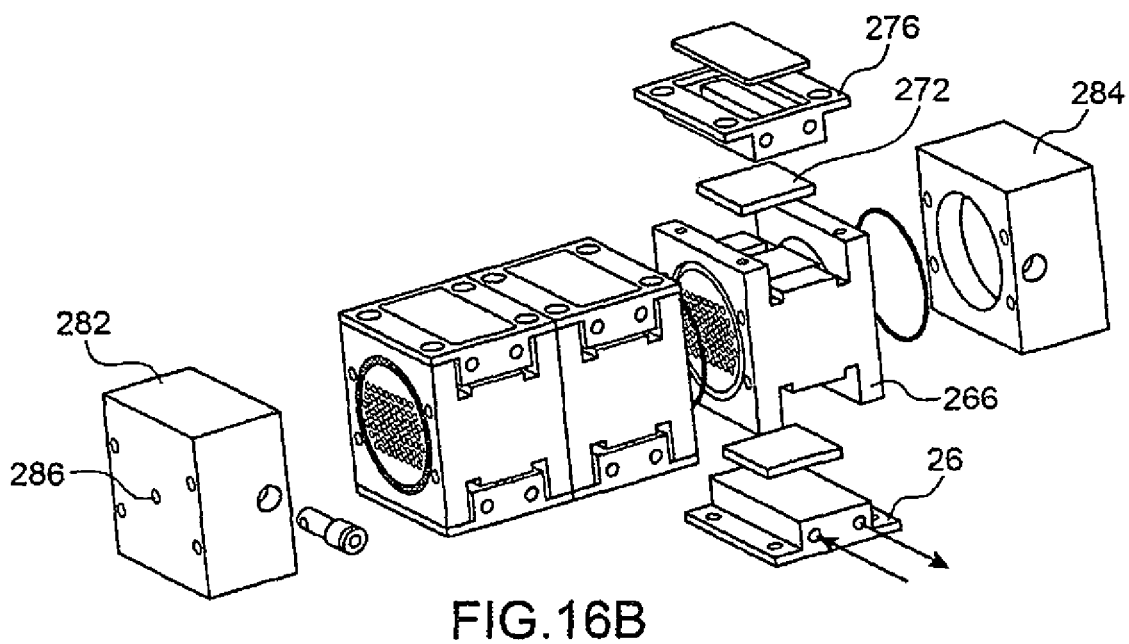

The drum can be inserted in an approximately parallelepiped shaped retaining structure 266, the top and bottom parts 268, 269 have been hollowed such that each of the two side faces of the drum can be brought into contact with a Peltier type cooling module 272, 274, as illustrated in FIG. 16B.

The hot face of the Peltier elements can be cooled using water circulation in an aluminium block 276, 278 in contact with the face to be cooled. A thermostat-controlled bath holds the temperature of the water flow to the required temperature. Several elementary condensers like that in FIG. 16A can be stacked, as illustrated in FIG. 16B. The assembly can be placed between an inlet block 282 and an outlet block 284, that allow inlet and outlet of the gas through an inlet orifice 286 and an outlet orifice (not shown on FIG. 16B) respectively.

Air saturated with solvent vapours will circulate in the cooled channels 264 of the condenser, and therefore the solvent will be condensed.

Regardless of what embodiment is envisaged, the instructions particularly to activate the print head to produce ink jets and the gutter pumping means 53 and/or the means 73 for sending a gas into the print head and/or the means 57 for sending ink into the print head and/or the means 30, 32 of cleaning the filter are produced and sent by the control means (also called the "controller"). These are the instructions that cause circulation of ink under pressure towards the print head, then generate jets as a function of motifs to be printed on a support 800 (FIG. 1). These control means may for example be made in the form of a processor, or a programmable electric or electronic circuit, or a microprocessor programmed to implement a method according to the invention.

This controller also controls opening and closing of valves on the path of the different fluids (ink, solvent, gas), and operation of the means of circulating a fluid in the filter means according to the invention (for example valves 45 and 47 in FIG. 6A or 6B), or pumps 30, 32, 51. The control means can also memorise data, for example data for measurement of ink levels in one or more reservoirs, and process these data.

FIG. 1 shows the main blocks of an inkjet printer (for example a continuous inkjet printer or CIJ printer) that can implement one or several of the embodiments described above.

Such a printer comprises a print head 1 (that can also have the structure illustrated on FIG. 2) and means 200, 300, 400 of supplying printing ink to the head. The print head is connected to a recovery circuit like that described above.

A printer according to the invention may comprise a console 300, a compartment containing particularly the ink and solvent conditioning circuit 400, and reservoirs for ink and solvents (in particular, the reservoir to which ink recovered by the gutter is delivered). In general, this compartment is in the lower part of the console. The top part of the console comprises the control and instrumentation electronics and display means. The console is hydraulically and electrically connected to a print head 1 through an umbilical 200.

Means for maintaining the head, for example a portal frame not shown, are used to install the print head facing a print support 800, which moves along a direction materialised by an arrow. This direction is perpendicular to an alignment axis of the nozzles. Preferably, these means are controlled, through the controller, so that printing can be performed on surfaces which are not flat, for example cables or bottles or cans. In a preferred embodiment, these means can maintain the distance (for example at least between 4 mm and 5 mm, in particular for a CIJ printer) between a printing head and the substrate which must be printed higher than in conventional desk printers.

Figure 2:
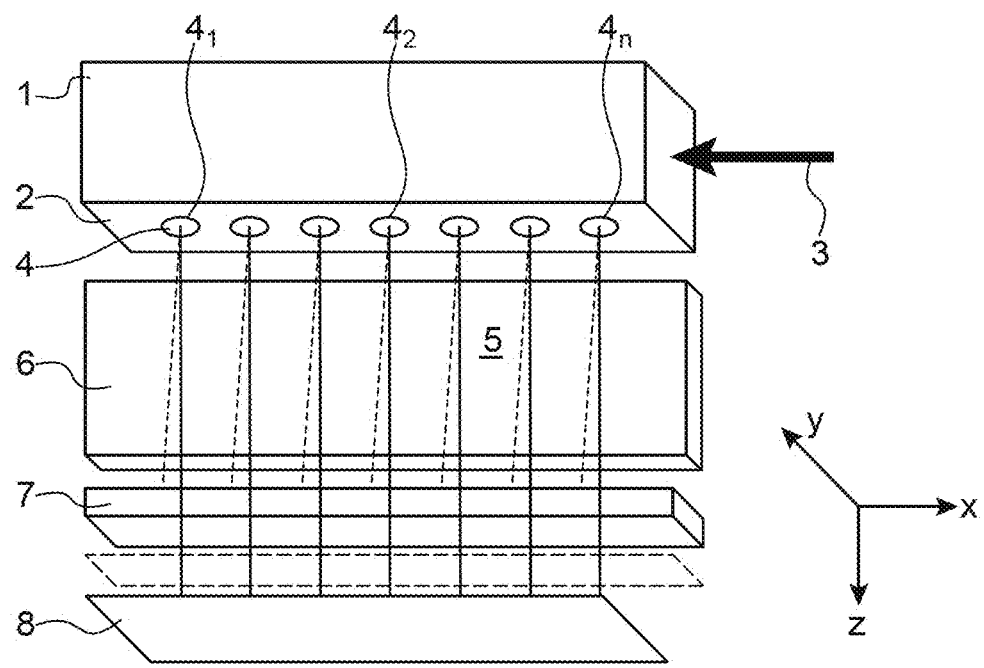
FIG. 2 represents a diagrammatic isometric view of a print head, showing principally the components of the print head located downstream from the nozzles.
Figure 3:
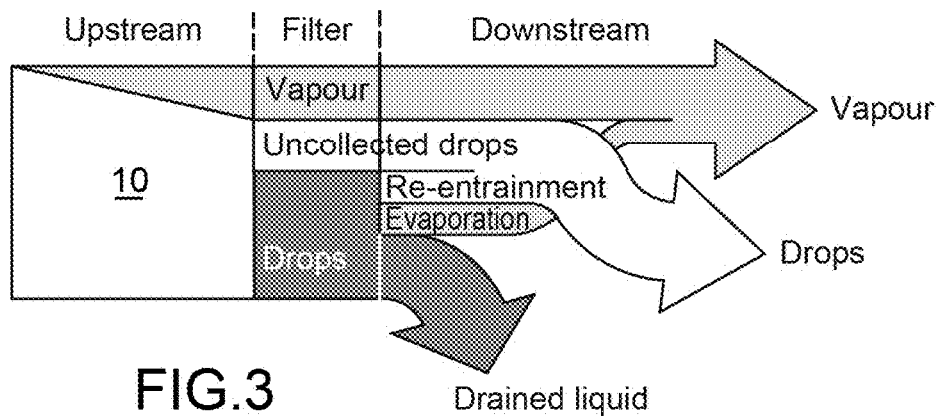
FIG. 3 represents a filter and fluid flows upstream and downstream from the filter.

One example of a print head that can be used with a device or a method according to the invention is illustrated in FIG. 2 and has been described above.

Figure 17:
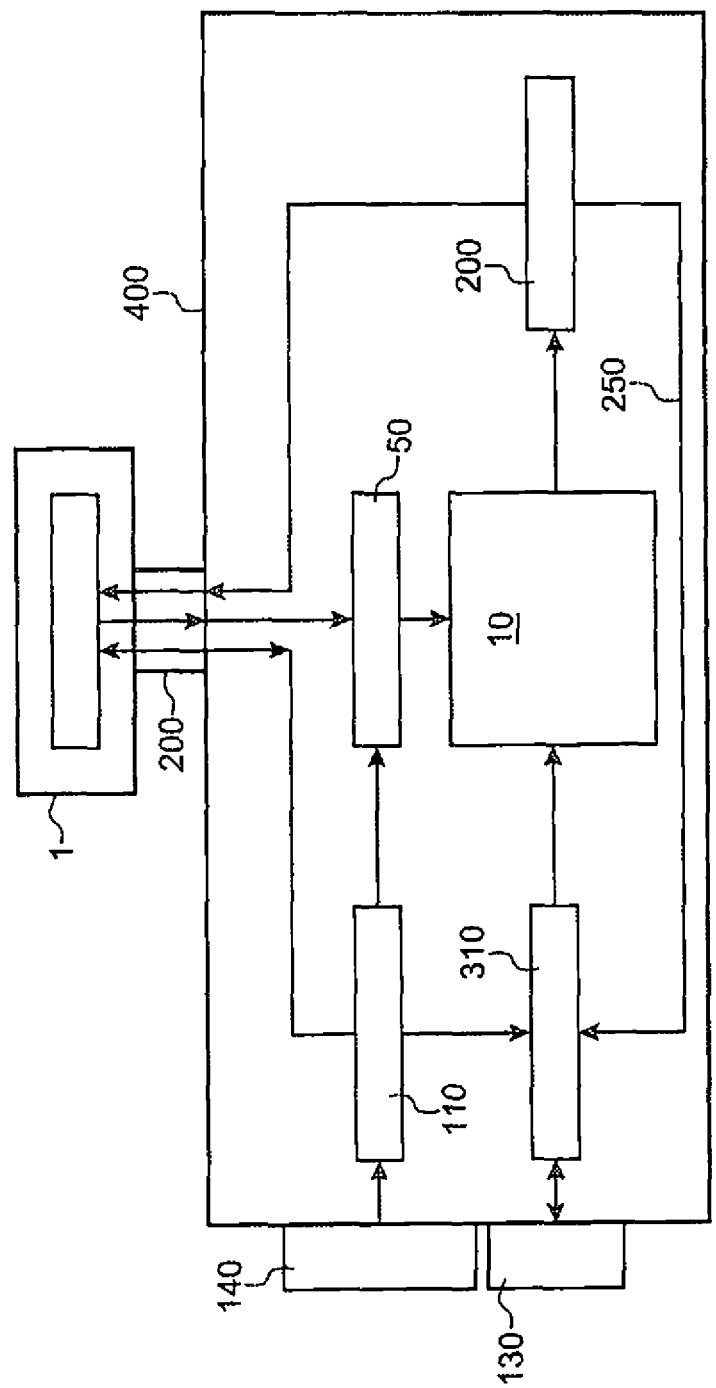
FIG. 17 represents an example structure of a fluid circuit to which the invention might be applied.

An example of a fluid circuit 400 of a printer to which the invention can be applied is illustrated in FIG. 17. This fluid circuit 400 comprises a plurality of means 10, 500, 110, 220, 310, each associated with a special function. There is also the head 1 and the umbilical 200.

This circuit 400 is associated with a removable ink cartridge 130 and a solvent cartridge 140 that is also removable.

Reference 10 designates the main reservoir, that collects a mix of solvent and ink.

Reference 110 designates means of drawing off and possibly storing solvent from a solvent cartridge 140 and providing solvent thus drawn off to other parts of the printer, either to supply solvent to the main reservoir 10, or to clean or maintain one or several other parts of the machine.

Reference 310 designates all means of drawing off ink from an ink cartridge 130 and providing ink thus drawn off to supply the main reservoir 10. As can be seen on this figure, according to the embodiment presented herein, these same means 310 are used to send solvent to the main reservoir 10 and from the means 110.

At the outlet from the reservoir 10, a set of means globally designated as reference 220 applies pressure to the ink drawn off from the main reservoir and sends it to the print head 1 (these means comprise particularly the pump 57, 59 in FIG. 6A or 6B above). According to one embodiment illustrated herein by the arrow 250, it is also possible to use these means 220 to send ink to the means 310, and then again to the reservoir 10, which enables recirculation of ink inside the circuit. This circuit 220 is also used to drain the reservoir in the cartridge 130 and to clean connections of the cartridge 130.

The system shown on this figure also includes means 500 of recovering fluids (ink and/or solvent) that return from the print head, more precisely from the gutter 7 of the print head or the head rinsing circuit. Therefore these means 500 are arranged downstream from the umbilical 200 (relative to the direction of circulation of fluids that return from the print head). In particular, they include means 53 in FIG. 6A or 6B, but they can also include a solvent vapours treatment circuit according to one embodiment of the invention.

As can be seen in FIG. 17, the means 110 can also be used to send solvent to these means 500 directly without passing through the umbilical 200 or through the print head 1 or through the catcher.

The means 110 can comprise at least 3 parallel solvent supplies, one to the head 1, the 2nd to the means 500 and the 3rd to the means 310.

Each of the means 500, 110, 210, 310 described above can be provided with a pump to treat the fluid concerned (namely 1st pump, 2nd pump, 3rd pump, 4th pump respectively). These different pumps perform different functions (the functions of each of their means) and are therefore different from each other, even though these different pumps may be of the same type or similar types (in other words none of these pumps performs 2 of these functions).

Such a circuit 400 is controlled by the control means described above that are usually contained in the console 300 (FIG. 1).

The invention is particularly useful in applications in which the air or gas flow in the cavity in the print head and in the recirculation circuit is high, since a high air flow creates a correspondingly larger risk of allowing solvent to escape.

For example, the flow may be of the order of several tens of l/h or several hundred l/h, for example between 10 l/h and 10000 l/h, or for example between about 300 l/h and 1000 l/h. These values are particularly applicable to the case of a print head with 64 jets, but the invention is also applicable to the case of a print head with a smaller number of jets, for example 16, or to the case of a print head with a larger number of jets, for example 128.

The printers concerned by the invention are industrial printers, for example which have the ability to print on surfaces which are not flat, for example cables or bottles or cans. Another aspect of such printers is that the distance between the printing head and the substrate which must be printed is higher than in conventional desk printers. For example that distance is at least between 4 mm and 5 mm for a CIJ printer.

Another aspect of such printers is their speed: their maximum speed is up to 10-15 m/s.

Another aspect of such printers is that they can print on very different surfaces, for example glass, or metal or blisters or packaging materials.

The invention claimed is:

1. A device for recovery of an atmosphere containing solvent vapours from at least one ink recovery reservoir of a print machine comprising:
   n (n≥1) filter(s) arranged downstream from said at least one ink recovery reservoir, each filter:
   comprising an inlet face, an outlet face and a filter body between these two faces, and
   being upstream from solvent extraction means, an atmosphere output from said at least one ink recovery reservoir passing through a separator and through said inlet face, and then through said filter body and through said outlet face before being sent to said solvent extraction means,
   said device further comprising at least one second reservoir to recover liquid from said separator.

2. The device according to claim 1 in which n>1, and comprising at least a valve to select a single filter to treat an atmosphere output from said at least one ink recovery reservoir.

3. The device according to claim 1, said separator bringing at least part of the liquid condensed on the inlet face of each of the n filter(s) to said at least one second reservoir.

4. The device according to claim 1, said separator directing the liquid that flows by gravity from the inlet face of the filter to said at least one second reservoir.

5. The device according to claim 1, also comprising:
a circuit to introduce some of the liquid outlet from said solvent extraction means or from a solvent reservoir, through the outlet face of at least one of the filters;
and/or a circuit to introduce some of the gas outlet from said solvent extraction means or from a gas reservoir, or some of the gas filtered by another filter, through the outlet face of at least one of the filters.

6. The device according to claim 5, in which n>1, and comprising at least a valve to select a circulation pathway, to the outlet face of only one of the filters:
for some of the liquid outlet from said solvent extraction means or from said solvent reservoir,
and/or or for some of the gas outlet from said solvent extraction means, or from a gas reservoir or from another filter.

7. The device according to claim 6 comprising:
at least a $1^{st}$ valve to select a $1^{st}$ filter for treating an atmosphere output from said at least one ink recovery reservoir;
while at least a $2^{nd}$ valve selects a circulation pathway to the outlet face of only one $2^{nd}$ filter:
for some of the liquid outlet from said solvent extraction means or from said solvent reservoir respectively,
and/or some of the gas outlet from said solvent extraction means or from said gas reservoir or from said $1^{st}$ filter respectively.

8. The device according to claim 5, comprising at least a circuit to bring some of the gas outlet from said solvent extraction means, through the outlet face of each filter, said circuit carrying circulation of this gas in a closed loop in the gas supply system of the print head.

9. The device according to claim 1, in which n>1, and comprising:
at least a $1^{st}$ valve to select a filter treating an atmosphere from said at least one ink recovery reservoir; and
at least a $2^{nd}$ valve to simultaneously clean another filter.

10. The supply circuit for at least one print head, comprising:
at least one ink recovery reservoir, to recover ink not used for printing and to supply at least said print head with ink; and
a recovery device of an atmosphere originating from said at least one ink recovery reservoir, according to claim 1.

11. A printer comprising at least one print head and a supply circuit according to claim 10, said print head comprising a plurality of nozzles to form k jets, where k≥1.

12. The device according to claim 1, wherein said separator separates particles from said atmosphere output from said at least one ink recovery reservoir.

13. A method for recovery of an atmosphere from at least one ink recovery reservoir of a print machine comprising:
filtering of an atmosphere output from a separator arranged downstream from said at least one ink recovery reservoir using at least one filter comprising an inlet face, an outlet face and a filter body between these two faces, said filter being arranged downstream from said separator but upstream from solvent extraction means, an atmosphere output from said at least one ink recovery reservoir passing through said separator, through said inlet face, and then through said filter body and through said outlet face, before being sent to said solvent extraction means, and
recovery, in at least one second reservoir, of at least part of a liquid separated from an atmosphere by said separator.

14. The method according to claim 13, in which the following are introduced through the output face of said at least one filter:
some of the liquid outlet from said solvent extraction means or from a solvent reservoir; and
then possibly part of the gas that exits from said solvent extraction means or from a gas reservoir or from another filter, to dry the filter.

15. The method according to claim 13, in which n>1, and in which a circulation pathway is selected to only one of the filters:
for part of the liquid outlet from said solvent extraction means or from a solvent reservoir,
and/or for some of the gas outlet from said solvent extraction means, or from a gas reservoir or from another filter.

16. The method according to claim 15, in which:
a $1^{st}$ filter is selected to treat an atmosphere output from said at least one ink recovery reservoir, and
a pathway to a $2^{nd}$ filter is selected for circulation of some of the liquid outlet from said solvent extraction means or from said solvent reservoir respectively, and/or some of the gas outlet from said solvent extraction means or from a gas reservoir or from another filter.

17. The method according to claim 13, in which part of the gas output from said solvent extraction means to dry said at least one filter circulates in a closed loop in the print head gas supply system.

18. The method according to claim 12, in which n>1, and in which an atmosphere from said separator is filtered by a $1^{st}$ filter, a $2^{nd}$ filter being cleaned at the same time.

19. The method according to claim 13, in which at least part of the liquid condensed on the inlet face of each filter flows by gravity from the inlet face of the filter and is directed to said second reservoir.

20. The method according to claim 13, the liquid that flows by gravity from the inlet face of the filter to said second reservoir being recovered firstly by a liquid-gas separator placed between the filter and said second reservoir.

21. The method according to claim 13, in which the flow of a filtered atmosphere is between 10 l/h and 10000 l/h.

22. The method according to claim 13, wherein said separator separates particles from said atmosphere output from said at least one ink recovery reservoir.

23. The device for recovery of an atmosphere containing solvent vapours from at least one ink recovery reservoir of a print machine comprising:
n (n≥1) filter(s) arranged downstream from said at least one ink recovery reservoir, each filter:
comprising an inlet face, an outlet face and a filter body between these two faces, and
being upstream from a solvent condenser, an atmosphere output from the said at least one ink recovery reservoir, passing through a separator and through said inlet face, and then through said filter body and through said outlet face before being sent to said solvent condenser,
said device further comprising at least one second reservoir to recover liquid from said separator.

* * * * *

UNITED STATES PATENT AND TRADEMARK OFFICE
CERTIFICATE OF CORRECTION

PATENT NO. : 10,549,538 B2  
APPLICATION NO. : 16/052229  
DATED : February 4, 2020  
INVENTOR(S) : Jean Xing et al.

Page 1 of 1

It is certified that error appears in the above-identified patent and that said Letters Patent is hereby corrected as shown below:

In the Specification

Column 14, Line 18, "denaturing" should read --desaturing--.

In the Claims

Column 25, Line 41, Claim 10, "The" should be --A--.

Column 26, Line 30, Claim 17, "The method according to claim 13" should be --The method according to claim 14--.

Column 26, Line 34, Claim 18, "The method according to claim 12" should be --The method according to claim 13--.

Column 26, Line 50, Claim 23, "The" should be --A--.

Signed and Sealed this  
Nineteenth Day of May, 2020

Andrei Iancu  
*Director of the United States Patent and Trademark Office*